(12) United States Patent
Kim et al.

(10) Patent No.: US 9,405,462 B2
(45) Date of Patent: Aug. 2, 2016

(54) INTERACTION METHOD BETWEEN ELECTRONIC PAPERS, MACHINE-READABLE STORAGE MEDIUM AND ELECTRONIC PAPER

(71) Applicant: Samsung Electronics Co., Ltd., Gyeonggi-do (KR)

(72) Inventors: Young-Woong Kim, Seoul (KR); Seong-Woon Kang, Gyeonggi-do (KR); Sung-Jin Park, Seoul (KR); Kyu-Suk Lee, Gyeonggi-do (KR); Jong-In Lee, Gyeonggi-do (KR); Kyung-Hoon Cha, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 343 days.

(21) Appl. No.: 14/031,501

(22) Filed: Sep. 19, 2013

(65) Prior Publication Data

US 2014/0092044 A1 Apr. 3, 2014

(30) Foreign Application Priority Data

Sep. 28, 2012 (KR) .......... 10-2012-0109170

(51) Int. Cl.
*G09G 5/00* (2006.01)
*G06F 3/0488* (2013.01)
*G06F 15/02* (2006.01)

(52) U.S. Cl.
CPC .......... *G06F 3/0488* (2013.01); *G06F 15/0291* (2013.01)

(58) Field of Classification Search
CPC .................................................. G06F 3/0488
USPC ................... 345/1.1, 173, 174; 715/205, 206
See application file for complete search history.

(56) References Cited

U.S. PATENT DOCUMENTS

| 6,512,497 B1 * | 1/2003 | Kondo | G06F 3/147 345/1.1 |
| 2007/0195009 A1 * | 8/2007 | Yamamoto | G06F 1/1652 345/1.1 |
| 2011/0209039 A1 * | 8/2011 | Hinckley | G06F 3/04883 715/206 |

FOREIGN PATENT DOCUMENTS

JP 2006039834 2/2006

* cited by examiner

*Primary Examiner* — Calvin C Ma
(74) *Attorney, Agent, or Firm* — The Farrell Law Firm, P.C.

(57) ABSTRACT

A method and apparatus for performing interaction between electronic papers is provided. A first electronic paper recognizes installation of a binder on the first electronic paper. The first electronic paper sets an interaction mode according to the installation of the binder on the first electronic paper. The first electronic paper establishes a communication connection with a second electronic paper on which the binder is also installed. The first electronic paper performs data communication with the second electronic paper according to the interaction mode.

20 Claims, 21 Drawing Sheets

INTERACTION METHOD BETWEEN ELECTRONIC PAPERS, MACHINE-READABLE STORAGE MEDIUM AND ELECTRONIC PAPER

PRIORITY

This application claims the priority under 35 U.S.C. §119 (a) to Korean Application Serial No. 10-2012-0109170, which was filed in the Korean Intellectual Property Office on Sep. 28, 2012, the content of which is incorporated herein by reference.

BACKGROUND OF THE INVENTION

1. Field of the Invention

The present invention relates generally to an electronic paper, and more particularly, to an interaction method between electronic papers.

2. Description of the Related Art

Paper is one of the oldest and most widely used mediums for conveying information. Paper is generally and widely used in various environments. Data on paper is shared using various types of Office Automatic (OA) apparatuses including, for example, a printer, a copying machine, a fax machine.

Thus, various expensive OA apparatuses are required to share data that is conveyed on paper, and costs for maintenance of the OA apparatuses are also high. Further, paper may be less effective when processing a large amount of data at the same time, and corresponding costs and time are required.

SUMMARY OF THE INVENTION

The present invention has been made to address at lest the above problems and/or disadvantages and to provide at least the advantages described below. Accordingly, an aspect of the present invention provides a method for easily moving/copying/changing/deleting electronic paper data by using a binder in a form of a paper clip, without complicated connections or configurations.

Another aspect of the present invention provides convenience by providing an intuitive User Interface (UI) by introducing and utilizing interaction using conventional peripheral apparatuses of paper.

In accordance with an aspect of the present invention, a method for performing interaction between electronic papers is provided. A first electronic paper recognizes installation of a binder on the first electronic paper. The first electronic paper sets an interaction mode according to the installation of the binder on the first electronic paper. The first electronic paper establishes a communication connection with a second electronic paper on which the binder is also installed. The first electronic paper performs data communication with the second electronic paper according to the interaction mode.

In accordance with another aspect of the present invention, a non-transitory machine-readable storage medium is provided for storing one or more programs that when executed implement the steps of: recognizing, by a first electronic paper, installation of a binder on the first electronic paper; setting, by the first electronic paper, an interaction mode according to the installation of the binder on the first electronic paper; establishing, by the first electronic paper, a communication connection with a second electronic paper on which the binder is also installed; and performing, by the first electronic paper, data communication with the second electronic paper according to the interaction mode.

In accordance with an additional aspect of the present invention, an article of manufacture is provided for performing interaction between electronic papers comprising a non-transitory machine-readable storage medium for storing one or more programs that when executed implement the steps of recognizing, by a first electronic paper, installation of a binder on the first electronic paper; setting, by the first electronic paper, an interaction mode according to the installation of the binder on the first electronic paper; establishing, by the first electronic paper, a communication connection with a second electronic paper on which the binder is also installed; and performing, by the first electronic paper, data communication with the second electronic paper according to the interaction mode.

In accordance with another aspect of the present invention, an electronic paper is provided that includes a sensor that recognizes installation of a binder on the electronic paper. The electronic paper also includes a communication unit that establishes a communication connection with a second electronic paper on which the binder is also installed, and performs data communication with the second electronic paper. The electronic paper further includes a controller that sets an interaction mode according to the installation of the binder on the electronic paper, and transmits or receives data according to the interaction mode.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
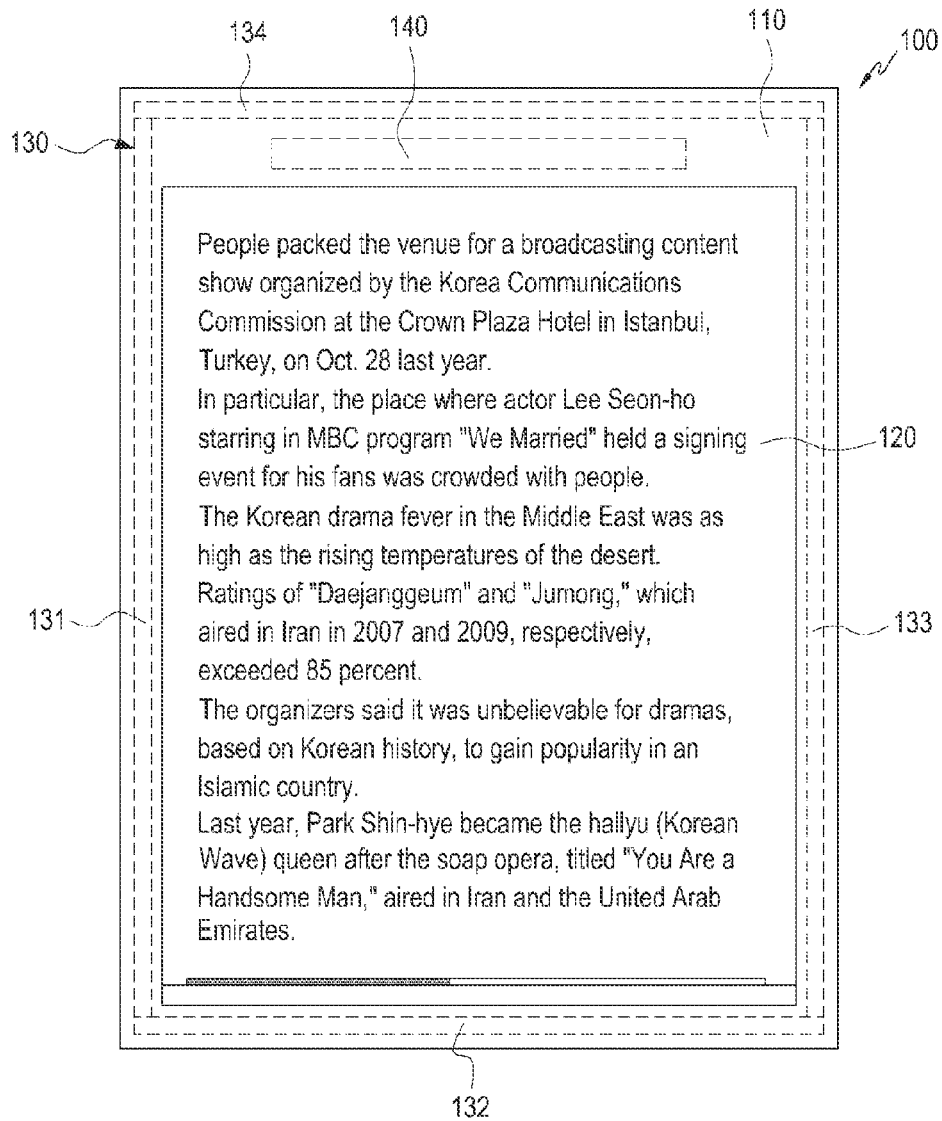
FIG. 1 is a diagram illustrating plane view of an Electro-Phoretic Display (EPD) panel, according to an embodiment of the present invention.

Embodiments of the present invention are described in detail with reference to the accompanying drawings. The same or similar components may be designated by the same or similar reference numerals. Detailed descriptions of constructions or processes known in the art may be omitted to avoid obscuring the subject matter of the present invention.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as that commonly understood by one of ordinary skill in the art to which this invention belongs. It will be further understood that terms used herein should be interpreted as having a meaning that is consistent with their meaning in the context of this specification and the relevant art, and will not be interpreted in an idealized or overly formal sense unless expressly so defined herein.

The EPD panel, according to the present invention, displays content on an image sheet, and updates a screen of the image sheet according to a user input or information detected by a binder. The content may include a menu screen, a still image (i.e., a photograph), a document (i.e., an e-book, a digital newspaper, a web page), or the like.

In an embodiment of the present invention, an EPD panel is described as an example of electronic paper. However, embodiments of the present invention may be applied to an electronic paper in a certain structure or format for displaying the content by internal or external ambient light, without an internal lighting unit. Accordingly, the EPD panel and the EPD controller may be alternately referred to as electronic paper, and an electronic paper controller, respectively.

Figure 2:
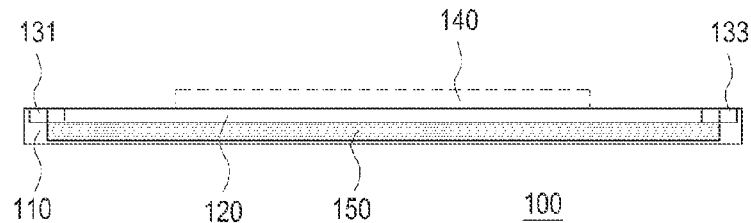
FIG. 2 is a diagram illustrating a cross-sectional view of the EPD panel, according to an embodiment of the present invention.

FIG. 1 is a diagram illustrating a plane view of an EPD panel according to an embodiment of the present invention. FIG. 2 is a diagram illustrating a cross-sectional view of the EPD panel, according to an embodiment of the present invention.

An EPD panel 100 includes a cover sheet 110 that protects other elements in the EPD panel 100, an image sheet 120 that displays content, a touch sensor 150 that senses a touch input by a user, an auxiliary sensor 130 that senses an interaction event according to binder installation, and a main board 140 that controls the image sheet 120, the touch sensor 150, and the auxiliary sensor 130. The main board 140 may be referred to as a main control circuit. The content includes, for example, a menu screen, a still image (i.e., a photograph), a document (i.e., an e-book, a digital newspaper, a web page), or the like.

The cover sheet 110 configures an outer surface of the EPD panel 100 together with an upper surface of the image sheet 120 to protect elements in the EPD panel 100, and may be formed with a synthetic resin such as, for example, polyimide, and PolyEthylene Terephthalate (PET), or a plastic material. The cover sheet 110 may be configured in the form of a square plate with a groove in the center to accept the image sheet 120. Alternatively, the cover sheet 110 may be configured to completely encompass other elements in the EPD panel 100, including the image sheet 120.

The cover sheet 110 may be selectively applied to the EPD panel 100, and may be configured so that other elements in the EPD panel 100 are encompassed in a manner such that a lower surface of the image sheet 120 and a top substrate are connected or attached to each other, instead of the cover sheet 110. Hereinafter, the terminology "an element is selectively applied" means that the element may be removed from the embodiment of the present invention.

The image sheet 120 has a structure in which pixels having the same configuration are arranged in an N×M matrix. The image displayed on the screen of the image sheet 120 (i.e., an upper surface of the image sheet 120) is configured with a set of points displayed by pixels. Additionally, elements of the image sheet 120 are described in greater detail below with reference to FIG. 3.

Figure 3:
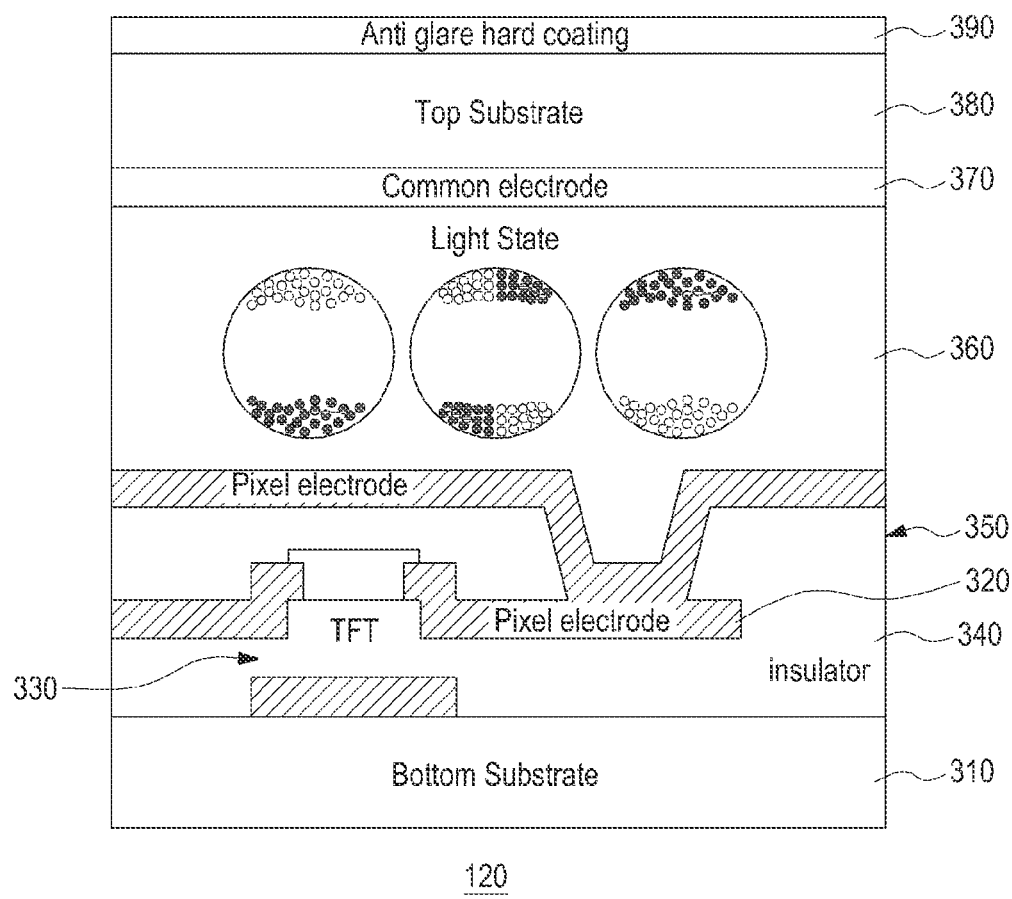
FIG. 3 is a diagram illustrating a cross-sectional view of a pixel in an image sheet, according to an embodiment of the present invention.

FIG. 3 is a diagram illustrating a cross-sectional view of a pixel in an image sheet, according to an embodiment of the present invention. Materials and a thickness of each component are set so that the image sheet 120 can be flexible and thin.

The image sheet 120 is lighted by ambient light from the outside, and displays content by reflection and absorption of the light.

The image sheet 120 includes a bottom substrate 310, an organic electronics backplane 350 that is an electrode layer, an ink layer 360, a common electrode layer 370, a top substrate 380, and a hard coating layer 390, which are sequentially stacked.

The bottom and top substrates 310 and 380 protect the ink layer 360 and the electrode layers 350 and 370, respectively. The substrates 310 and 380 may be formed with a synthetic resin such as, for example, polyimide or PET, or a plastic material, which can ensure a heat-resisting property, high transmittance, and a desirable feeling for writing. The bottom substrate 310 is approximately 20 to 30 μm thick, and preferably, is approximately 22.5 to 27.5 μm thick.

The hard coating layer 390 may be stacked on an upper surface of the top substrate 380, and may have an antiglare function. For example, the hard coating layer 390 may be formed with a material in which a light scattering agent is added to a general hard coating agent. The hard coating layer 390 may be selectively applied to the top substrate 380, and the hard coating layer 390 and the top substrate 380 may be approximately 24 to 36 μm thick, and preferably, may be approximately 27 to 33 μm thick.

The ink layer 360 represents color or black-and-white image patterns by movements of particles according to an applied electric field (i.e., an electrophoretic effect), and displays an image by reflection and absorption of external light entering the pattern. For example, the ink layer 360 has a configuration in which microcapsules, filled with transparent fluid including white and black particles, are arranged between the organic electronics backplane 350 and the common electrode layer 370. The ink layer 360 displays black-and-white image patterns by applying an electric field to the microcapsules. For example, since the white particles are positively charged and the black particles are negatively charged, the white and black particles move in directions opposite to each other. The image patterns of the ink layer 360 are maintained until a change of the electric field occurs. The ink layer 360 may display color image patterns, and the color display may be realized by stacking a color filter on the ink layer 360, or using color particles instead of black and white particles that configure the ink layer 360.

The common electrode layer 370 may be interposed between the ink layer 360 and the top substrate 380, may maintain a constant potential, and may be connected to the ground. The common electrode layer 370 and the ink layer 360 may be approximately 32 to 48 μm thick, and preferably, may be approximately 36 to 44 μm thick.

The organic electronics backplane 350 may be divided into a plurality of pixels, and each pixel includes a pixel electrode 320, which is partially or totally buried in an insulator 340, and a Thin Film Transistor (TFT) 330. Conductor portions of the common electrode layer 370 and the organic electronics backplane 350, including the pixel electrode 320 and the thin film transistor 330, are formed with a carbon-containing organic material, such as, for example, graphene. The organic electronics backplane 350 may be approximately 4 to 6 μm thick, and preferably, may be approximately 4.5 to 5.5 μm thick.

The image sheet 120 may generally be approximately 0.08 to 0.2 mm thick, and preferably, may be approximately 0.09 to 0.11 mm thick. The image sheet 120 may configure a single electronic paper or EPD. The electronic paper may also be approximately 0.08 to 0.2 mm thick, and preferably, may be approximately 0.09 to 0.11 mm thick.

Figure 4:
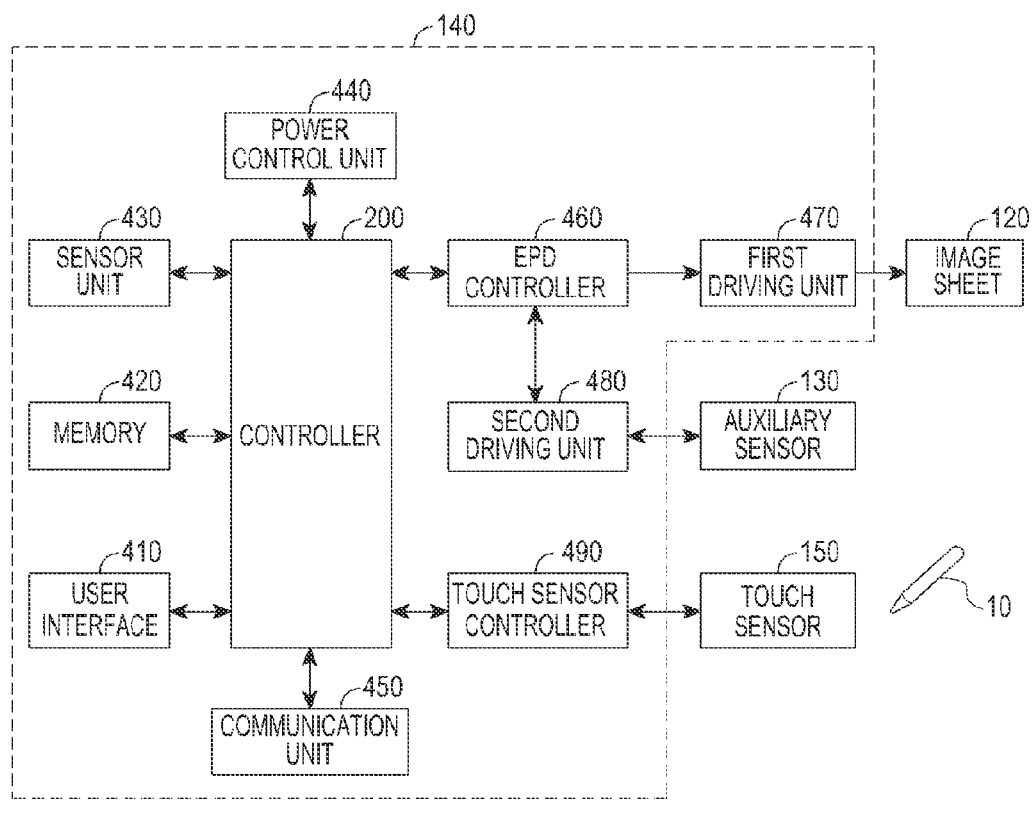
FIG. 4 is a diagram illustrating a configuration of a main board, according to an embodiment of the present invention.

FIG. 4 is a diagram illustrating a configuration of a main board, according to an embodiment of the present invention.

The main board 140 includes a sensor unit 430, a memory 420, a user interface 410, a communication unit 450, a power control unit 440, an EPD controller 460, first and second driving units 470 and 480, a touch sensor controller 490, and a controller 200. The EPD controller 460 and the touch sensor controller 490 may be integrated into the controller 200, and the functions thereof may be performed by the controller 200.

The EPD panel 100 may perform an image transfer operation in association with external devices. The EPD panel 100 receives content desired by a user via a communication network such as, for example, the Internet, and transfers an image indicating the content on the image sheet 120. For example, the EPD panel 100 may perform an operation under the control of the external device, and the control by the external device may be realized in various manners.

The communication unit 450 may be a wired or wireless communication unit, and may transmit data from the controller 200 by wire or wirelessly. The communication unit 450 may receive data from an external communication line or wirelessly, and transmit the data to the controller 200.

The communication unit 450 may include at least one of a mobile communication module, a wireless LAN module, and a near field communication module.

The mobile communication module enables the EPD panel 100 to be connected to an external device via a mobile communication by using one or a plurality of antennas (not illustrated) under the control of the controller 200. The mobile communication module transmits/receives wireless signals for a voice communication, a video communication, a Short Message Service (SMS) or a Multimedia Message Service (MMS) with a cellular phone (not illustrated), a smart phone (not illustrated), a tablet PC, or other devices (not illustrated) which have a phone number input to the EPD panel 100.

The wireless LAN module may be connected to the Internet at a position where a wireless Access Point (AP) (not illustrated) under the control of the controller 200. The wireless LAN module conforms to the wireless LAN standard (IEEE 802.11x) of Institute of Electrical and Electronics Engineers (IEEE). The near field communication module may wirelessly perform a near field communication between the EPD panel 100 and an image forming apparatus (not illustrated) under the control of the controller 200. The near field communication technique may include Bluetooth, an Infrared Data Association (IrDA) communication, a Wi-Fi-Direct communication, and a Near Field Communication (NFC).

The user interface 410 may include a plurality of buttons, a microphone, a speaker, a vibration motor, a connector, a keypad, a touch screen, a camera, or the like, which are units for receiving user input or for providing information to a user.

The buttons may be formed on the main board 140 or a front surface, a side surface, or a rear surface of the EPD panel 100, and may include a power/lock button (not illustrated), a volume button (not illustrated), a menu button, a home button, a back button, a search button, and the like.

The microphone receives a voice or a sound and generates a signal under the control of the controller 200.

The speaker may output sounds corresponding to various signals (for example, a wireless signal, a broadcasting signal, a digital audio file, a digital video file, or image capture) to the outside of the EPD panel 100 under the control of the controller 200. The speaker may output a sound corresponding to a function performed by the EPD panel 100. One or a plurality of speakers may be formed on the main board 140 or at a proper position(s) on the EPD panel 100.

The vibration motor may convert electric signals into mechanical vibrations under the control of the controller 200. For example, when the EPD panel 100 in a vibration mode receives a voice communication from another apparatus (not illustrated), the vibration motor operates. One or more vibration motors may be formed in the main board 140 or the EPD panel 100. The vibration motor may operate in response to the touch operation of the user who touches the image sheet 120 or the continuous movement of the touch on the image sheet 120.

The connector may be used as an interface for connecting the EPD panel 100 with an external device or a power source (not illustrated). The data stored in the memory 420 of the EPD panel 100 may be transmitted to an external apparatus or may receive data from the external apparatus via a wire cable connected to the connector under the control of the controller 200. A battery may be recharged or electric power may be input from the power source via the wire cable connected to the connector.

The keypad may receive a key input from a user for controlling the EPD panel 100. The keypad may include a physical keypad formed on the main board 140 or the EPD panel 100, or a virtual keypad displayed on the image sheet 120.

The touch screen may provide user interfaces corresponding to various services (for example, a communication, a data transmission, a broadcast, or image capture) to a user. The touch screen may transmit an analog signal corresponding to at least one touch input to a user interface to the controller 200. The touch screen may receive at least one touch by a body of the user (for example, a finger including a thumb) or a touchable input unit (for example, a stylus pen). In addition, the touch screen may receive a continuous movement of one touch out of the at least one touch. The touch screen may transmit an analog signal corresponding to continuous movement of the received touch to the controller 200.

According to the present invention, the touch is not limited to a contact of the body of the user or the touchable input unit with the touch screen or the image sheet 120, and may include non-touch (for example, a detectable distance from the touch screen to the body of the user or the touchable input unit is 1 mm or less). The touch screen may be realized by a resistive scheme, a capacity scheme, an infrared scheme, or an acoustic wave scheme.

The sensor unit 430 may include at least one sensor that detects a status of the EPD panel 100. For example, the sensor unit 430 may include a proximity sensor that detects whether the user is close to the EPD panel 100, a motion/direction sensor that detects a movement (for example, a rotation, an acceleration, a negative acceleration, or a vibration of the EPD panel 100) of the EPD panel 100, or a camera module. Further, the motion/direction sensor may include at least one of an acceleration sensor, a gravity sensor, a geomagnetic sensor, a gyro sensor, an impact sensor, a Global Positioning System (GPS), a compass sensor, and an acceleration sensor. The sensor unit 430 detects a status of the EPD panel 100, and generates a signal corresponding to the detection to transmit the generated signal to the controller 200. For example, the GPS module receives radio signals from a plurality of GPS satellites (not illustrated) in the Earth's orbit, and uses Time of Arrival (TOA) from the GPS satellites (not illustrated) to the EPD panel 100 to estimate the position of the EPD panel 100. A compass sensor estimates the position and the direction of the EPD panel 100.

The sensor unit 430 may include a camera that captures a still image or a moving image under the control of the controller 200. The camera may include a lens system, an image sensor, a flash, or the like. The camera converts optical signals received (or captured) through the lens system into electric image signals to output the converted image signals to the controller 200, and the user may capture a moving image or a still image through the camera.

The lens unit forms an image of an object by converging light incident from the outside. The lens system includes at least one lens, and each lens may be a convex lens, an aspheric lens, or the like. The lens system has symmetry with respect to the optical axis that goes through the center thereof, and the optic axis is defined by the central axis. The image sensor detects an optical image formed by the external light incident through the lens system into an electric image signal. The image sensor includes a plurality of pixel units arranged in a M×N matrix structure, and the pixel units may include a photodiode or a plurality of transistors. The pixel units accumulate electric charges generated by the incident light, and the voltage by the accumulated electric charge represents the illuminance of the incident light. When an image that configures a still image or a moving image is processed, the image signal that is output through the image sensor is configured into a set of voltages (that is, pixel values) output from the pixel units, and the image signal represents one frame (that is, a still image). That is, the frame is configured into M×N pixels. The image sensor may be a Charge-Coupled Device (CCD) image sensor, a Complementary Metal-Oxide Semiconductor (CMOS) image sensor, or the like.

The image sensor may operate the entire pixels or a pixel in an interested area out of the entire pixels according to the control signal received from the controller 200, and the image data output from the pixels is output to the controller 200.

The controller 200 processes images input from the camera or images stored in the memory 420 by frames so that the images frames converted according to the screen characteristics (i.e., size, definition, resolution, or the like) of the image sheet 120 are output to the image sheet 120 or stored in the memory 420.

The controller 200 controls all operations of the EPD panel 100 and other components in the EPD panel 100 to perform image transfer operations. Hereinafter, the controller refers to the controller 200, but the controller 200 may be referred to as a main controller in order to differentiate the controller from other controllers. The controller 200 may include a single-core processor, a dual-core processor, a triple-core processor, or a quad-core processor. The controller 200 receives broadcast signals (for example, a TV broadcast signal, a radio broadcast signal, or a data broadcast signal), or additional broadcast information (for example, Electric Program Guide (EPS) or Electric Service Guide (ESG)), which are transmitted from a broadcasting station through the communication unit 450. The controller 200 may also reproduce digital audio files (for example, with file extensions of mp3, wma, ogg, or way) that are stored in the memory 420 or received. The controller 200 may also reproduce digital video files (for example, with file extensions of mpeg, mpg, mp4, avi, mov, or mkv) that are stored in the memory 420 or received. The controller 200 may also transfer content which is stored in the memory 420 or received on the image sheet 120 in a form of an image, according to a user command, menu selection, or event information input through the sensor unit 430, the user interface 410, the touch sensor 150, or the auxiliary sensor 130. The image may be a still image or a moving image.

The memory 420 may store signals or data under the control of the controller 200. The memory 420 may store a control program or applications for controlling the EPD panel 100 or the controller 200.

"The memory" includes a Read-Only Memory (ROM) or a Random-Access Memory (RAM) in the controller 200, and a memory card (for example, a Secure Digital (SD) card, or a memory stick), a non-volatile memory, a volatile memory, a Hard Disk Drive (HDD), and a Solid State Drive (SSD), which are installed in the EPD panel 100.

The power control unit 440 may provide electric power to the EPD panel 100 under the control of the controller 200. The power control unit 440 may be connected to one or more batteries. In addition, the power control unit 440 provides electric power, received from the external source, to the EPD panel 100 through a wire cable connected to the connector.

The EPD controller 460 outputs control signals for driving the image sheet 120 and the auxiliary sensor 130 to the first and second driving units 470 and 480, respectively, and outputs interaction event information input from the auxiliary sensor 130 to the controller 200, under the control of the controller 200, with a predetermined EPD driving algorithm. The controller 200 may control the EPD controller 460 so that content displayed on the EPD panel 100 is adjusted or updated according to the interaction event information.

If the predetermined EPD driving algorithm is designed to consider the external environment. The EPD controller 460 receives sensing data relating to the external environment measured by the sensor unit 430. The sensor unit 430 may include a temperature sensor, an illuminance sensor, a humidity sensor, or the like.

Figure 5:
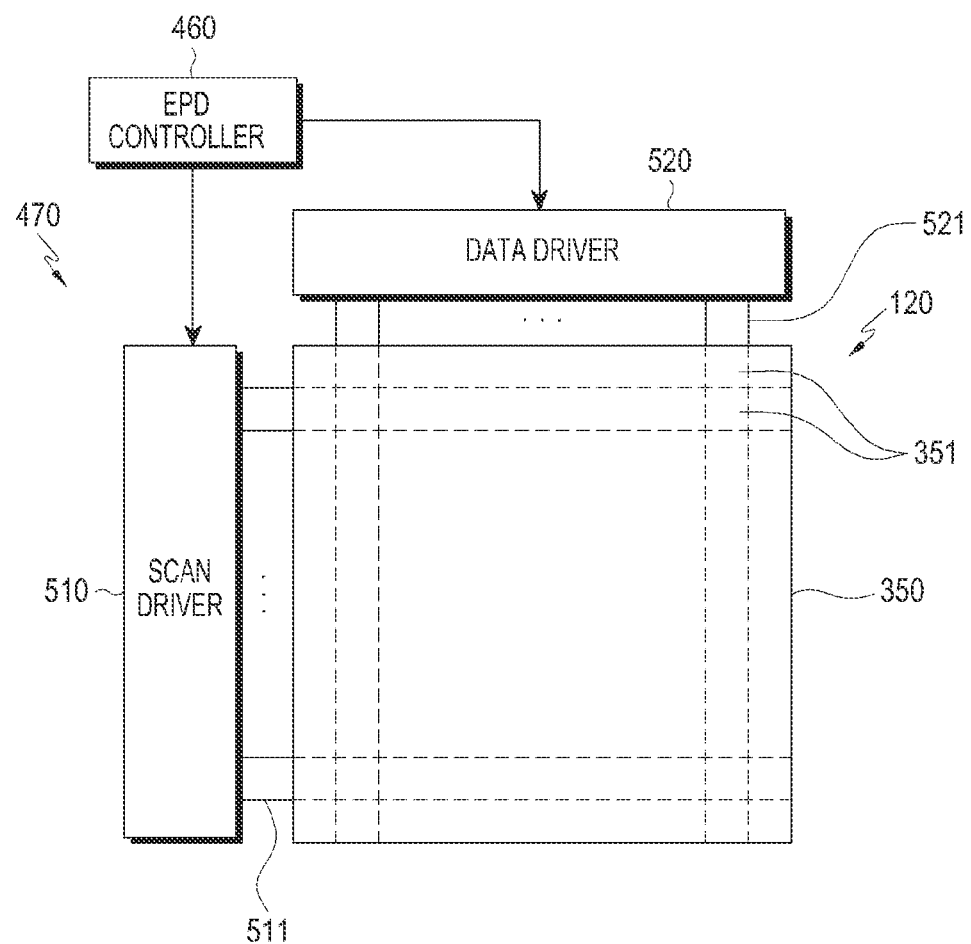
FIG. 5 is a diagram illustrating a method for driving the image sheet, according to an embodiment of the present invention.
Figure 6:
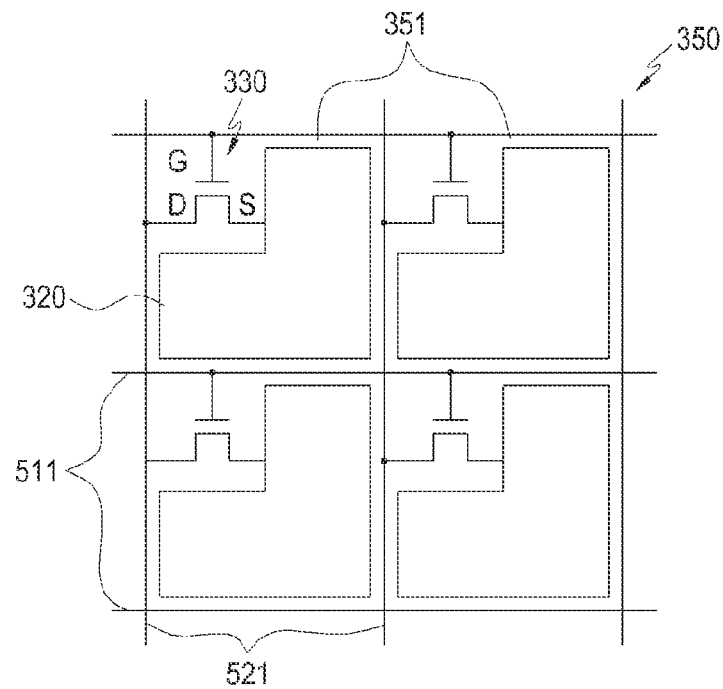
FIG. 6 is a diagram illustrating a circuit configuration of an organic electronics backplane, according to an embodiment of the present invention.

FIG. 5 is a diagram illustrating a method for driving the image sheet, according to an embodiment of the present invention. FIG. 6 is a diagram illustrating a circuit configuration of an organic electronics backplane, according to an embodiment of the present invention.

The first driving unit 470 generates address signals (i.e., row signals) and data signals (i.e., column signals) according to image display control signals, which are input from the EPD controller 460, and outputs the address signals and the data signals to the organic electronics backplane 350. The first driving unit 470 includes a scan driver 510 and a data driver 520. The scan driver 510 sequentially provides the address signals to scan lines 511 under the control of the EPD controller 460, and the data driver 520 provides data signals to data lines 521 under the control of the EPD controller 460.

The organic electronics backplane 350 provides a plurality of pixels 351, and each of the pixels 351 includes a pixel electrode 320 and a thin film transistor 330. The pixel electrode 320 is connected to the scan lines 511 and the data lines 521 through the corresponding thin film transistor 330. The thin film transistor 330 includes a gate G, a drain D, and a source S. The gate is connected to the scan lines 511, the drain is connected to the data lines 521, and the source is connected to the pixel electrode 320. The thin film transistor 330 functions as an on/off switch, and is turned on only when signals are supplied to both of the scan lines 511 and the data lines 521, which are connected. When the thin film transistor 330 is turned on, electric power is applied to the corresponding pixel electrode 320.

The ink layer 360 shows image patterns with movements of particles according to an electric field applied between the common electrode layer 370 and the organic electronics backplane 350. The ink layer 360 has image patterns according to the image transfer operation described above, and the image pattern is maintained until a next image transfer operation.

The image sheet 120 may provide user interfaces, corresponding to various services (for example, communication, data transmission, broadcasting, or image capturing), to the user. The touch sensor 150 may transmit analog signals corresponding to at least one touch input by the user to the controller 200. The touch sensor 150 may receive at least one touch through the body of the user (for example, a finger including a thumb) or a touchable unit (for example, a stylus pen). In addition, the touch sensor 150 may receive continuous movements of one touch from the at least one touch. The touch sensor 150 may transmit analog signals corresponding to the continuous movement of the input touch to the controller 200.

The touch sensor controller 490 outputs control signals for driving the touch sensor 150, to the touch sensor 150, under the control of the controller 200, with the predetermined touch sensor driving algorithm. The user input information, which is input to the touch sensor 150 with a user input unit such as a pen 10, is output to the controller 200. The controller 200 may control the EPD controller 460 so that content displayed on the EPD panel 100 is adjusted or updated according to the user input information. According to an embodiment of the present invention, the touch sensor 150 is an ElectroMagnetic Resonance (EMR) type touch sensor.

Figure 7:
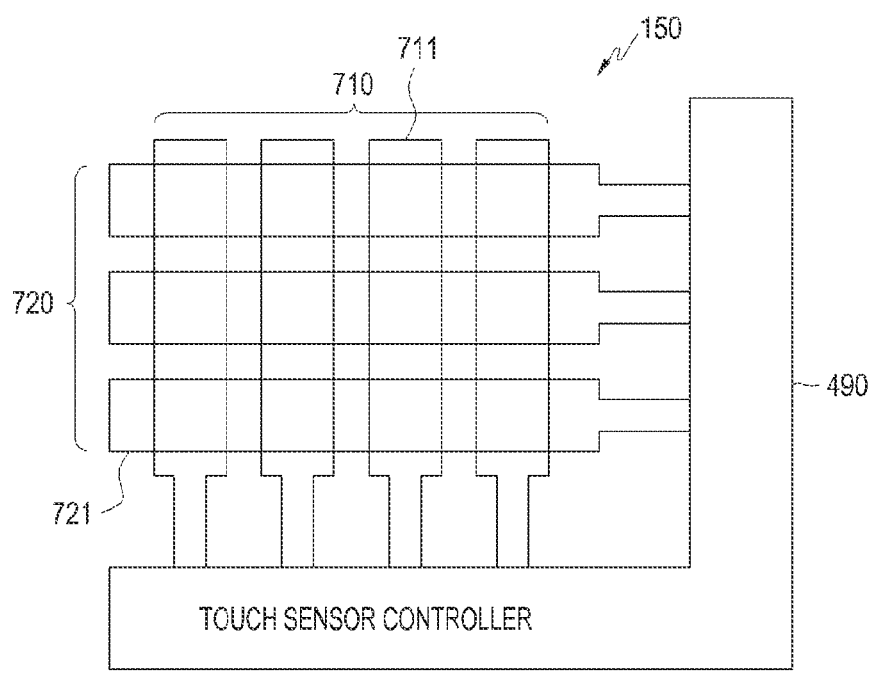
FIG. 7 is a diagram illustrating a touch sensor and a touch sensor controller, according to an embodiment of the present invention.

FIG. 7 is a diagram illustrating a touch sensor and a touch sensor controller, according to an embodiment of the present invention.

The touch sensor 150 is an EMR type touch sensor, and includes first and second loop units 710 and 720. The touch sensor 150 operates under the control of the touch sensor controller 490, and outputs the detected signals to the touch sensor controller 490. The first loop unit 710 includes a plurality of first loops 711, and the second loop unit 720 includes a plurality of second loops 721.

The first loop unit 710 and the second loop unit 720 may be arranged in directions crossing each other at approximately right angles.

The first loop unit 710 extends relatively longer in the y-axis direction than in the x-axis direction, and accordingly, is used to detect the x-axis coordinate of the pen input position (or the user input position, or the touch position).

The second loop unit 720 extends relatively longer in the x-axis direction than in the y-axis direction, and accordingly, is used to detect the y-axis coordinate of the pen input position.

The first and second loops 711 and 721 may output first signals on a first frequency in the form of electric signals, which are input from the touch sensor controller 490, into forms of electromagnetic waves. In addition, the first and second loops 711 and 721 detect second signals on a second frequency in the form of electromagnetic waves which are output from a pen in the outside into forms of electric signals, and outputs the second signals in forms of electric signals to the touch sensor controller 490.

When a pen 10 is near the touch sensor 150, it receives first signals in form of electromagnetic waves, which are output from the touch sensor 150. The pen then generates second signals in form of electromagnetic waves, according to the operation of a resonance circuit to output the generated second signals to the outside. The pen 10 is used in one embodiment of the present invention. The pen 10 is only required to be a unit that can output the second signals of the second frequency according to the input of the first signals on the first frequency. The pen 10 may be generally referred to as a user input unit. The pen 10 includes a resonance circuit, which consists of coils and capacitors, that enables the EMR type touch sensor 150 to sense the position thereof.

Figure 8:
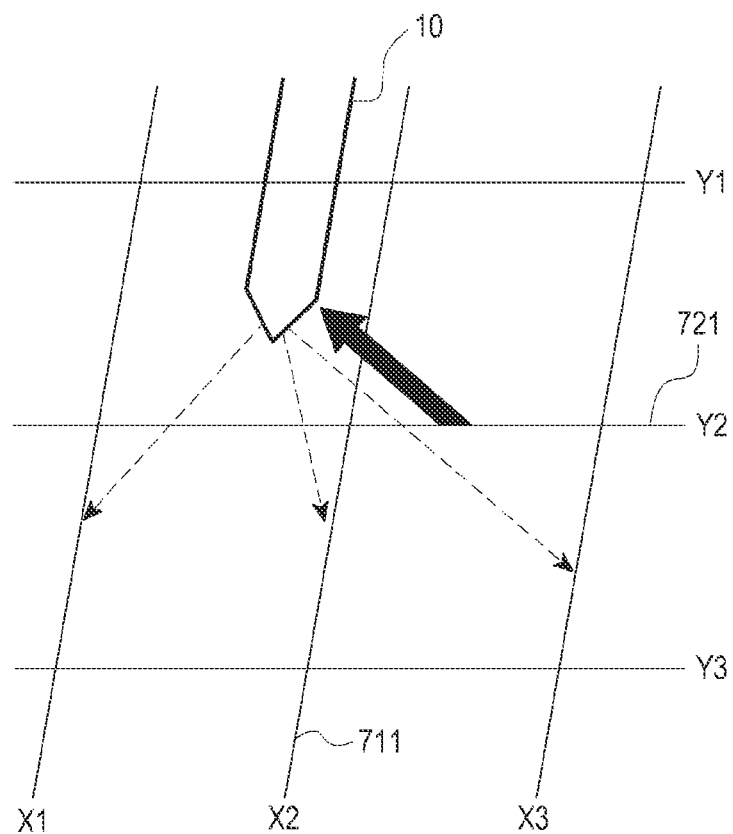
FIGS. 8 and 9 are diagrams illustrating methods of detecting a pen input position, according to an embodiment of the present invention.
Figure 9:
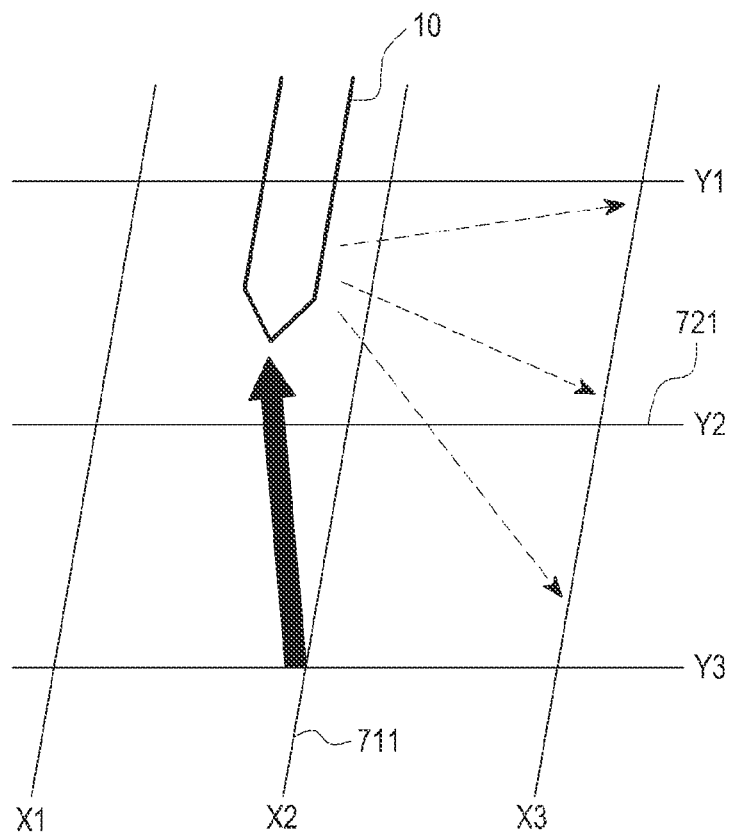

FIGS. 8 and 9 are diagrams illustrating methods of detecting a pen input position, according to an embodiment of the present invention. In FIGS. 8 and 9, each of the first and second loops 711 and 721 is schematically displayed with one line.

With reference to FIG. 8, the second loops 721 (hereinafter, referred to as a "Y2 loop") outputs first signals to the outside. The pen 10 receives the first signals in the form of electromagnetic waves, and generates the second signals in the form of electromagnetic waves, according to the operation of the resonant circuit to output the generated second signals to the outside. The first loops 711 (hereinafter, referred to as X1, X2, and X3 loops) sequentially detect second signals in forms of electric signals. The touch sensor controller 490 estimates an x-axis coordinate of the pen input position from a second signal having a peak value larger than a first threshold value output from the X2 loops out of the second signals.

With reference to FIG. 9, the first loops 711 (hereinafter, referred to as the X2 loop) output the first signals to the outside. The pen 10 receives the first signals in the form of the electromagnetic waves, and generates second signals in the form of the electromagnetic waves, according to the operation of the resonance circuit to output the generated second signals to the outside. The second loops 721 (hereinafter referred to as Y1, Y2, and Y3 loops) sequentially detect the second signals in the form of the electric signals. The touch sensor controller 490 estimates a y-axis coordinate of the pen input position from a second signal having a peak value larger than a first threshold value output from the Y2 loops out of the second signals.

The auxiliary sensor 130 is positioned at a left end portion, at a right end portion, at a lower portion, and at an upper portion of the cover sheet 110, to be positioned on a circumference of the image sheet 120.

The auxiliary sensor 130 senses installment or detachment of the binder, and has a form of first to fourth strips 131, 132, 133, and 134, which extend in the form of a square, as illustrated in FIG. 1. According to an embodiment of the present embodiment, the auxiliary sensor 130 senses the pressure by the binder. The auxiliary sensor 130 may have an arbitrary form for sensing the binder, and may be configured with one strip.

The auxiliary sensor 130 outputs, to the EPD controller 460, the interaction event information by installing the binder to the EPD panel 100 by the user.

The auxiliary sensor 130 senses the position or the sliding direction of the binder, and is configured to perform the interaction according to the position or the sliding direction of the binder.

Figure 10:
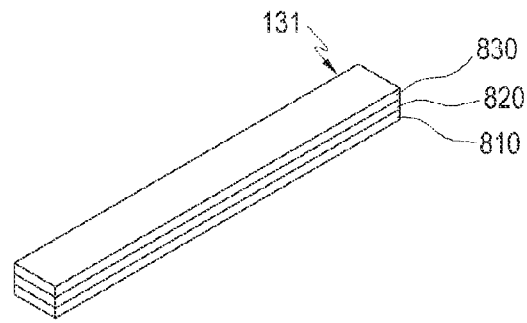
FIG. 10 is a perspective view of a first strip of the auxiliary sensor, according to an embodiment of the present invention.
Figure 11:
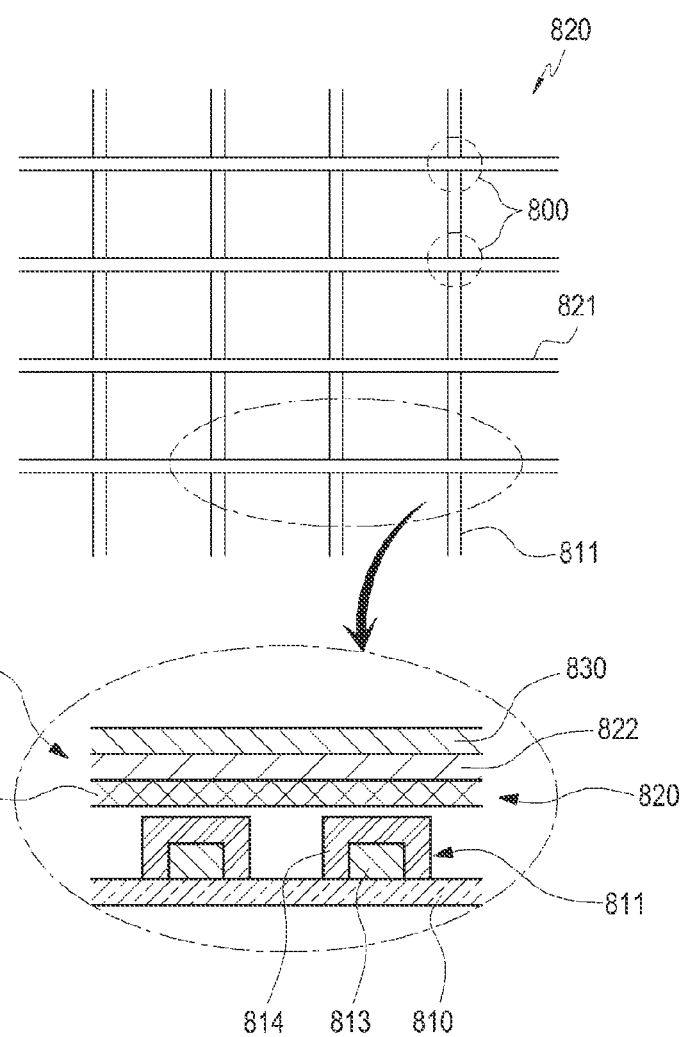
FIG. 11 is a diagram illustrating a principle in which the auxiliary sensor senses the installation or detachment of the binder, according to an embodiment of the present invention.

FIG. 10 is a diagram illustrating a perspective view of a first strip of the auxiliary sensor 130, according to an embodiment of the present invention. FIG. 11 is a diagram illustrating a principle in which the auxiliary sensor 130 senses the installation or detachment of the binder, according to an embodiment of the present invention. The description below is made with reference to the first strip 131, but the description is equally applicable to the second to fourth strips 132, 133, and 134.

The first strip 131 includes a sensor layer 820 for estimating the installation position and/or the pressure of the binder, and first and second substrates 810 and 830 that are stacked on a lower and an upper surface of the sensor layer 820, to support the sensor layer 820.

The sensor layer 820 has patterns for estimating the installation position and/or pressure of the binder, and, for example, may have various patterns such as a linear grid pattern and a diamond pattern. The description below is made with reference to a case in which the sensor layer 820 has a linear grid pattern.

First sensor lines 811 are stacked on the upper surface of the first substrate 810, second sensor lines 821 are stacked on the lower surface of the second substrate 830, and the upper surface of the first substrate 810 and the lower surface of the second substrate 830 face each other.

The first sensor lines 811 extends along a first direction (for example, the Y-axis or vertical axis), and are arranged with the same interval or different intervals along a second direction (for example, the X-axis or horizontal direction), which crosses the first direction at a right angle. The second sensor lines 821 extend along the second direction, which crosses the first direction at approximately a right angle, and are arranged with the same interval or different intervals along the first direction.

The principle in which the sensor layer 820 senses the installation of binder is as follows. The first sensor lines 811 stacked on the upper surface of the first substrate 810 include first electrode lines 813 that are directly stacked on the upper surface of the first substrate 810 and a first resistive layer 814 that is stacked to surround the exposed circumference surfaces of the first electrode lines 813. The second sensor lines 821, stacked on the lower surface of the second substrate 830, include second electrode lines 822 stacked on the lower surface of the second substrate 830 and a second resistive layer 823 stacked to surround the exposed circumference surfaces of the second electrode lines 822. The first and second substrates 810 and 830 may be formed with a synthetic resin such as, for example, polyimide or PET, or a plastic material. The first and second electrode lines 813 and 822 may be formed with carbon-containing organic material such as, for example, graphene. The first and second resistive layers 814 and 823 may be formed with a resistant material such as, for example, carbon, and the first and second resistive layers 814 and 823 may be separate or in contact with each other, and may have rough surfaces.

The second electrode lines 822 perform a sensor function by sequentially applying voltages in predetermined waveforms (i.e., scan signals). The first electrode line 813 outputs the sensing signals caused by the scan signals. If the binder pushes the first strip 131, all resistances of the first and second resistive layers 814 and 823 change, as the contact area of the first and second resistive layers 814 and 823 change. Due to the resistance change, the waveforms of the voltages of the sensing signals output from the first electrode line 813 are changed so that the installation position and/or the pressure of the binder can be estimated from the sensing signals, the waveforms of the voltages of which are changed. The points at which first and second sensor lines 811 and 821 cross each other become sensing points 800. According to an embodiment of the present embodiment, the sensing points 800 are arranged in a matrix structure. Specifically, the installation position of the binder is determined into at least one of the positions of the sensing points 800.

Figure 12:
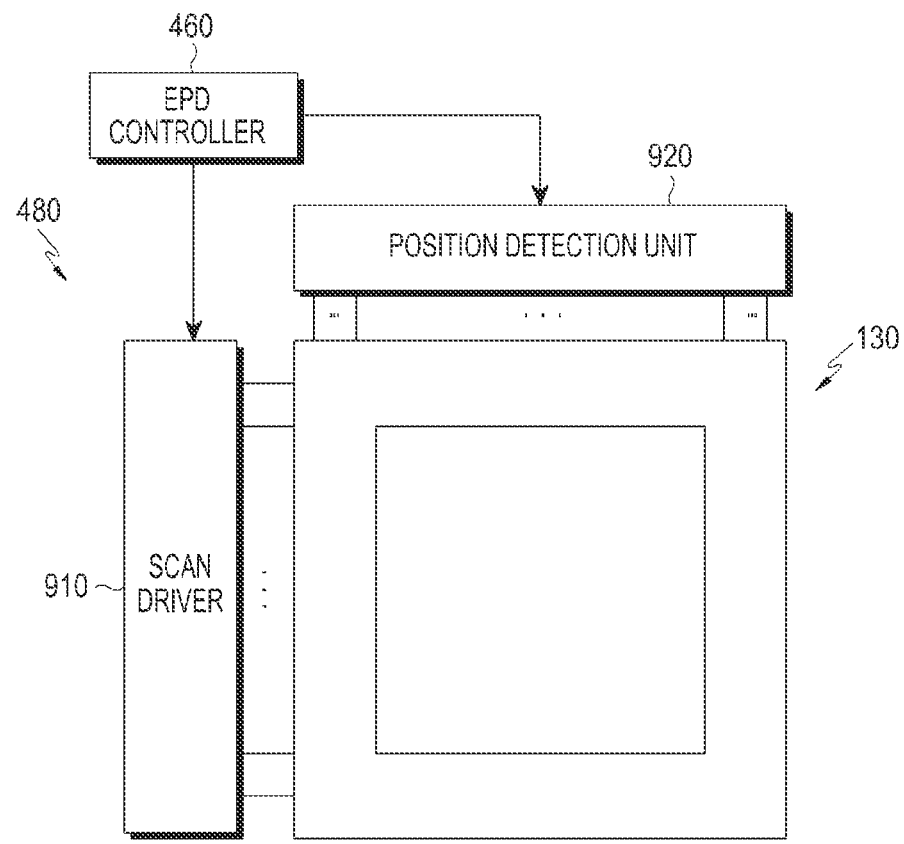
FIG. 12 is a diagram illustrating a method for driving the auxiliary sensor, according to an embodiment of the present invention.

FIG. 12 is a diagram illustrating a method for driving the auxiliary sensor, according to an embodiment of the present invention.

The second driving unit 480 drives the auxiliary sensor 130 under the control of the EPD controller 460, and outputs interaction event information including the position and/or the pressure estimated from the sensing signals output from the auxiliary sensor 130 to the EPD controller 460. A scan driver 910 sequentially provides the second electrode lines 822 with scan signals, under the control of the EPD controller 460. A position detection unit 920 estimates the installation position and/or the pressure of the binder from the sensing signals, which are output from the first electrode line 813 and the waveforms of the voltages of which are changed. The position detection unit outputs the estimated interaction event information to the EPD controller 460.

Figure 13A:
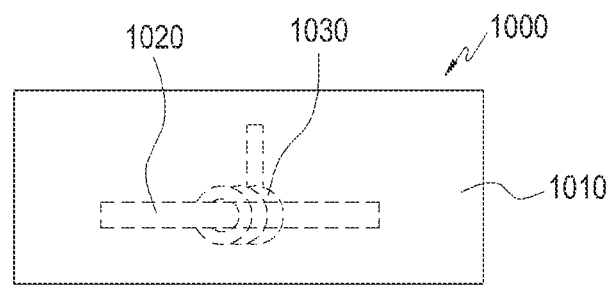
FIGS. 13A and 13B are diagrams illustrating a binder, according to an embodiment of the present invention.
Figure 13B:
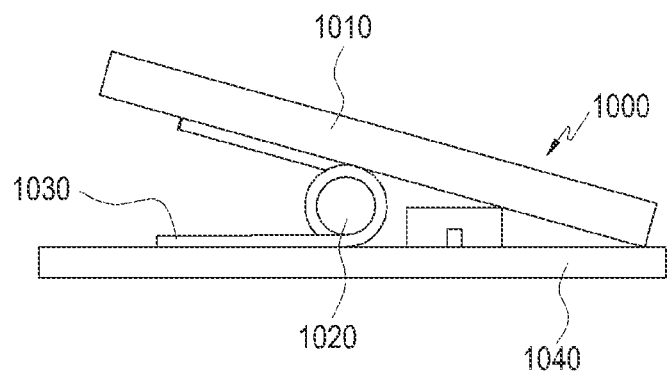

FIGS. 13A and 13B are diagrams illustrating a binder, according to an embodiment of the present invention. FIG. 13A is a plan view of the binder, and FIG. 13B is a side view of the binder.

A binder 1000 includes a substrate 1040, a pushing plate 1010 that the user pushes, an elastic member 1030 such as, for example, a spring, and a supporting member 1020 on which the elastic member 1030 is disposed. If the user pushes a first end portion of the pushing plate 1010, a second end portion of the pushing plate 1010 goes up. If the user releases the first end portion of the pushing plate 1010 after the EPD panel 100 is inserted into a space between the second end portion and the substrate 1040, the second end portion of the pushing plate 1010 attempts to return to its original position via the restoring force of the elastic member 1030, so that the EPD panel 100 is fixed.

Figure 14A:
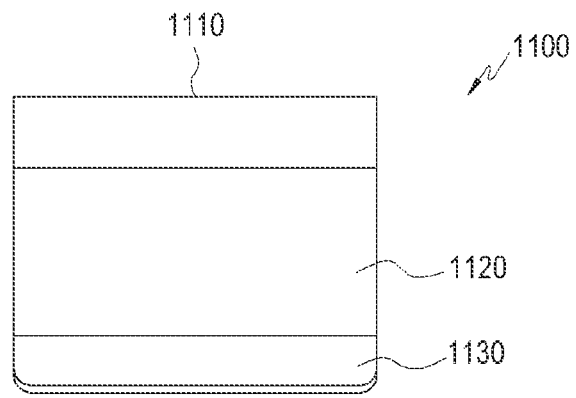
FIGS. 14A and 14B are diagrams illustrating a binder, according to another embodiment of the present invention.
Figure 14B:
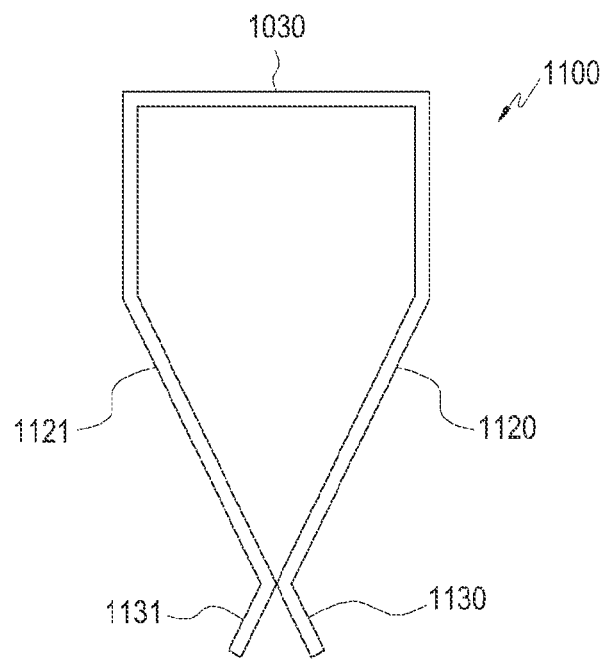

FIGS. 14A and 14B are diagrams illustrating a binder, according to another embodiment of the present invention. FIG. 14A is a plan view of the binder and FIG. 14B is a side view of the binder.

A binder 1100 may be formed by bending a strip-shaped plate formed by a metal such as, for example, stainless steel. The binder 1100 includes a square plate-shaped base portion 1030, first and second arm portions 1120 and 1121, having end portions that extend in a longitudinal direction from the base portion 1030 and then bend to face and contact each other in an elastic manner. First and second incoming portions 1130 and 1131 are bent to extend away from each other at end portions of the first and second arm portions 1120 and 1121.

The user spreads the first and second incoming portions 1130 and 1131, and then inserts the EPD panel 100 into the space between the first and second incoming portions 1130 and 1131. Thereafter, if the force applied by the user is released, the first and second arm portions 1120 and 1121 attempt to return to their original positions fixing the EPD panel 100.

According to an embodiment of the present invention, the binder is installed on a plurality of EPD panels, the plurality of EPD panels sense the installation of the binders, and each of the EPD panels performs interaction according to the position and/or the sliding direction of the binder. An example of the interaction between the first and second EPD panels will be described in greater detail below. However, the interaction may also be performed between three or more EPD panels. When first and second EPD panels are overlapped, if binders are installed on the first and second EPD panels, each of the EPD panels configures an interaction mode based on the position and/or the sliding direction of the binder. The first and second EPD panels establish a connection according to the predetermined communication scheme and communicate interaction-related data.

Figure 15:
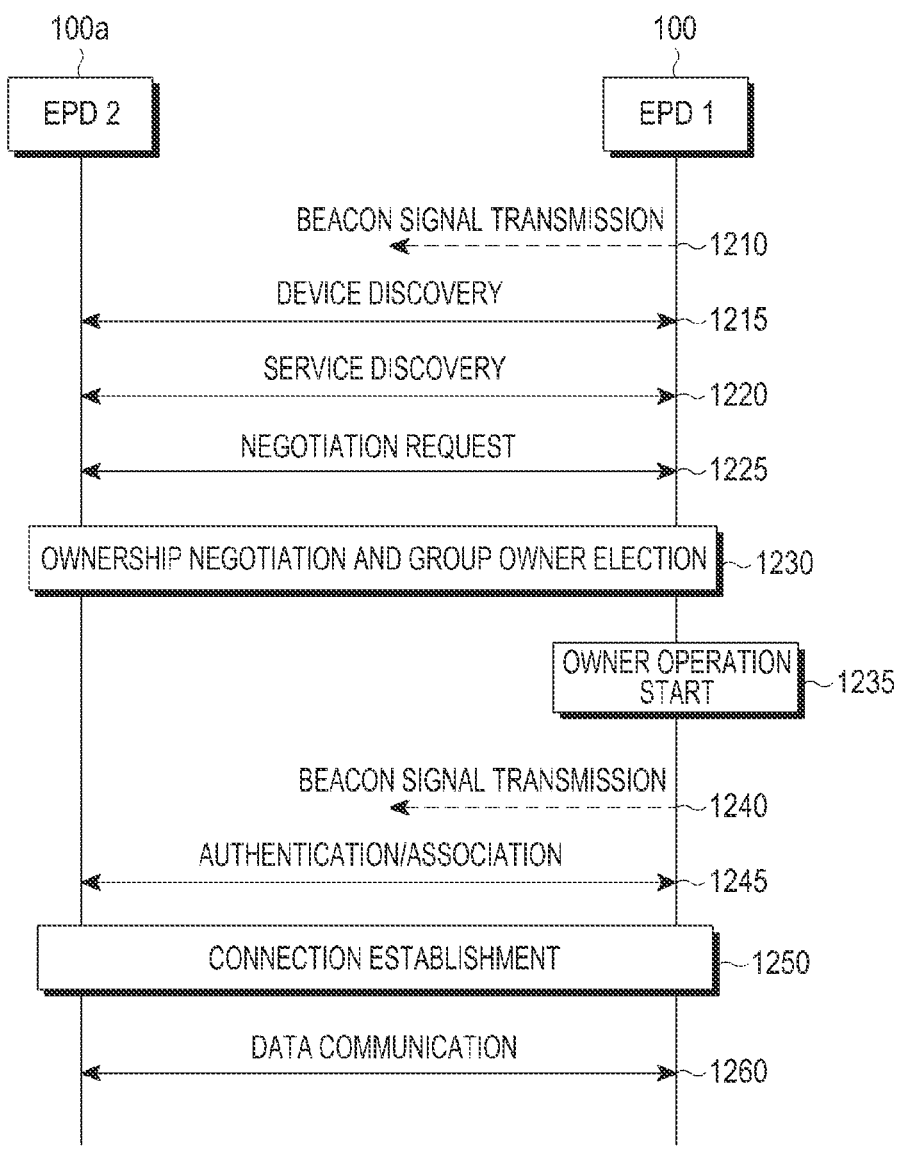
FIG. 15 is a sequence diagram illustrating an interaction between first and second EPD panels, according to an embodiment of the present invention.

FIG. 15 is a sequence diagram illustrating an interaction between first and second EPD panels, according to an embodiment of the present invention. The EPD panel illustrated in FIG. 1 is referred to as the first EPD panel 100, and a second EPD panel 100a has the same configuration as the first EPD panel 100. According to an embodiment of the present embodiment, the first and second EPD panels 100 and 100a establish a connection through Wi-Fi Direct and communicate data. Further, according to an embodiment of the present embodiment, the first EPD panel 100 becomes a master of the group and the second EPD panel 100a becomes a slave of the group.

In step 1210, each of the EPD panels 100 and 100a periodically transmits beacon signals (or messages), which includes a device ID that is unique identifier information.

In step 1215, each of the EPD panels 100 and 100a performs a discovery process for searching peripheral devices so that the first and second EPD panels 100 and 100a identify each other.

In step 1220, the first and second EPD panels 100 and 100a perform a service discovery process for searching for supportable services so that each of the EPD panels 100 and 100a identifies whether the counterpart panel can support the service desired to be used.

In step 1225, the first EPD panel 100 determines a pseudo value with respect to the position as a group owner in response to the discovered service. The first EPD panel 100 may determine a pseudo value by referring to a pseudo value mapping table for services. Subsequently, the first EPD panel 100 generates a group owner negotiation request message (hereinafter, referred to as a negotiation request message) including the determined pseudo value of the first EPD panel 100. Thereafter, the first EPD panel 100 transmits the negotiation request message including the pseudo value of the first EPD panel 100 to the second EPD panel 100a. Each pseudo value may be set as a basically determined default value. The first EPD panel 100 may identify that the first EPD panel 100 itself is set to be a master by user input or by automatically sensing the installation of the binder. The first EPD panel 100 may determine the highest pseudo value so that the first EPD panel 100 can be a group owner. On the contrary, the second EPD panel 100a may determine the lowest pseudo value so that the second EPD panel 100a does not become a group owner. For example, the first EPD panel 100 may recognize that the first EPD panel 100 is the master if the pressure of the binder exceeds the predetermined value.

The second EPD panel 100a transmits a group owner negotiation response message (hereinafter, referred to as a negotiation response message) including the pseudo value of the second EPD panel 100a to the first EPD panel 100 in response to the negotiation request message. On the contrary, if the second EPD panel 100a first transmits the negotiation request message including the pseudo value of the second EPD panel 100a, the negotiation response message including the pseudo value of the first EPD panel 100, which is determined by the first EPD panel 100, can be sent. In this manner, the subject that sends the negotiation request message may not necessarily be the first EPD panel 100, and negotiation messages are sent and received in order to identify pseudo values of the counterpart panels.

The negotiation request message may include a group ID. The group ID may be generated by using Media Access Control (MAC) addresses of the first or second EPD panel 100 or 100a that requested the negotiation, random numbers, their own IDs, and the like.

If the second EPD panel 100a has entered another group, the second EPD panel 100a compares the group ID included in the request message with a group ID stored in advance. If the two group IDs are not identical to each other according to the comparison result, the negotiation request may be refused. In the case of the negotiation refusal, the following processes may not be performed.

In step 1230, the first EPD panel 100 identifies the pseudo value included in the negotiation response message, and the second EPD panel 100a identifies the pseudo value included in the negotiation request message. The ownership negotiation and the group owner election are performed between the first EPD panel 100 and the second EPD panel 100a. Specifically, the first EPD panel 100 compares the pseudo value thereof and the pseudo value of the second EPD panel 100a and selects an EPD panel having the higher pseudo value as a group owner. According to an embodiment of the present invention, it is described that the first EPD panel 100 has a higher pseudo value than the second EPD panel 100a.

In step 1235, the first EPD panel 100 starts an owner operation. Specifically, the first EPD panel 100 performs an operation performed by an Access Point (AP), not performed by a client (or a slave), in order to perform a group owner operation.

In step 1240, the first EPD panel 100 transmits beacon signals.

In step 1245, the first EPD panel 100 performs authentication/association processes with the second EPD panel 100a.

In step 1250, a connection between the first and second EPD panels 100 and 100a is established.

In 1260, the first and second EPD panels 100 and 100a communicate data for interaction with each other, which is set according to the installation of the binder.

Figure 16:
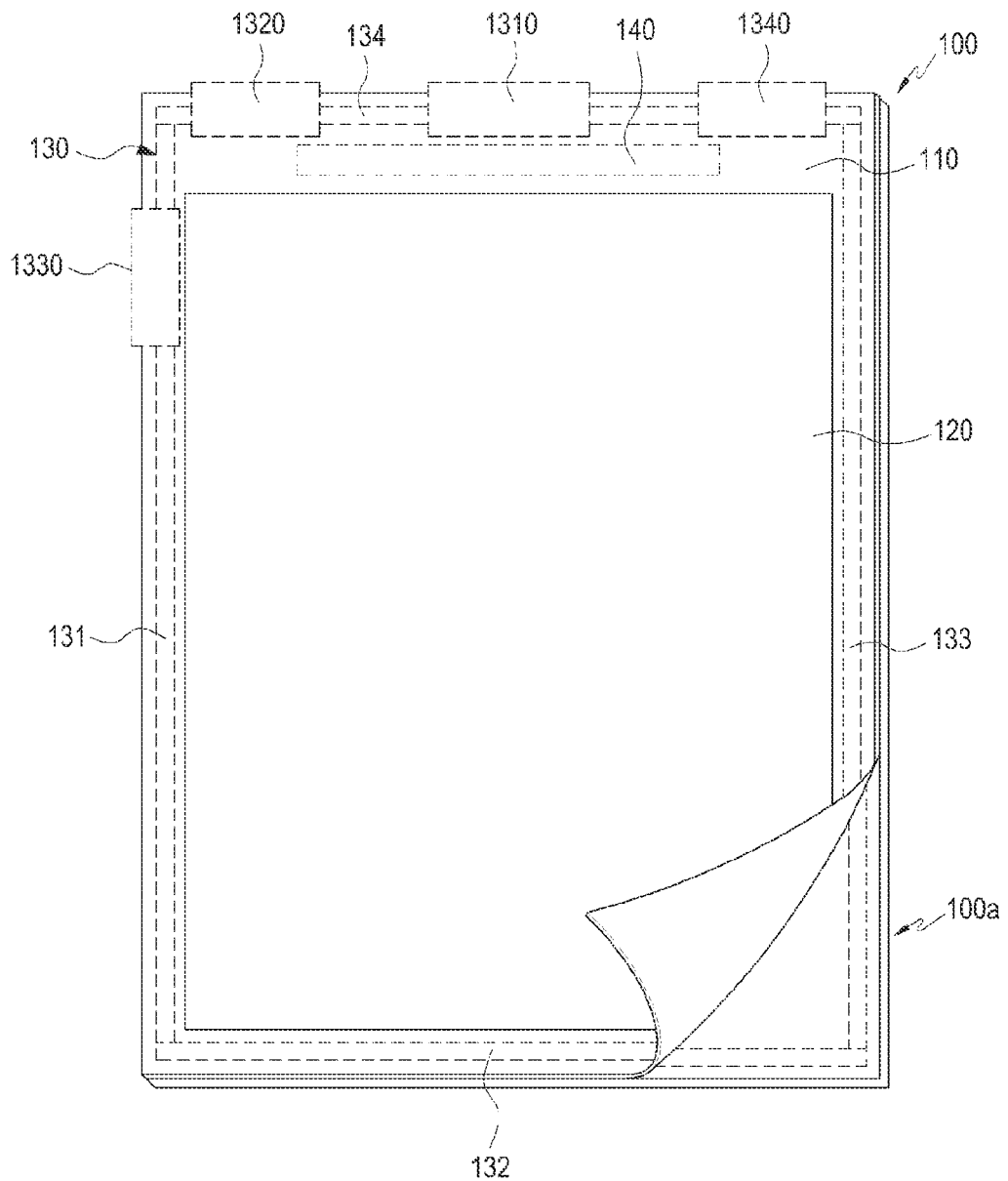
FIG. 16 is a diagram illustrating a setting of an interaction mode, according to an embodiment of the present invention.

FIG. 16 is a diagram illustrating a setting of an interaction mode, according to an embodiment of the present invention.

When the first and second EPD panels 100 and 100a are overlapped, if the binder is installed on the first and second EPD panels 100 and 100a, each of the EPD panels 100 and 100a sets an interaction mode based on positions 1310, 1320, 1330, and 1340, and/or sliding directions of the binder.

When the binder is installed on a center portion 1310 of the upper border of the EPD panels 100 and 100a, a carbon paper interaction mode for simultaneously writing the same content is set. When the binder is installed on a left portion 1320 of the upper border of the EPD panels 100 and 100a, a stapler interaction mode for integrating separate pieces of content is set. When the binder is installed on a right portion 1340 of the upper border of the EPD panels 100 and 100a, a discard interaction mode for simultaneously discarding data is set. When the binder is installed on an upper portion 1330 of the left end portion of the EPD panels 100 and 100a, a copy interaction mode for copying the same content is set.

Figure 17:
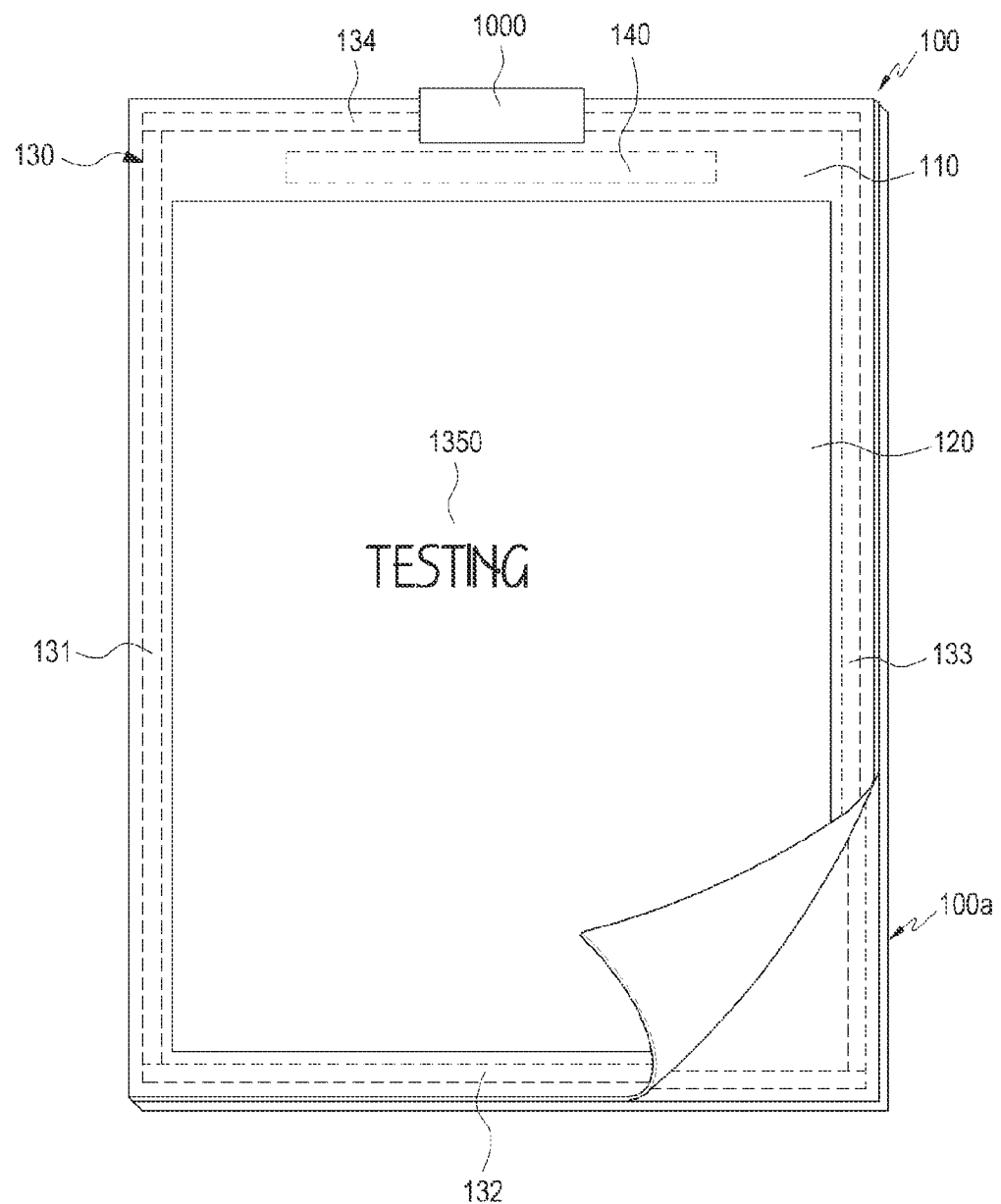
FIGS. 17 and 18 are diagrams illustrating a carbon paper interaction, according to an embodiment of the present invention.
Figure 18:
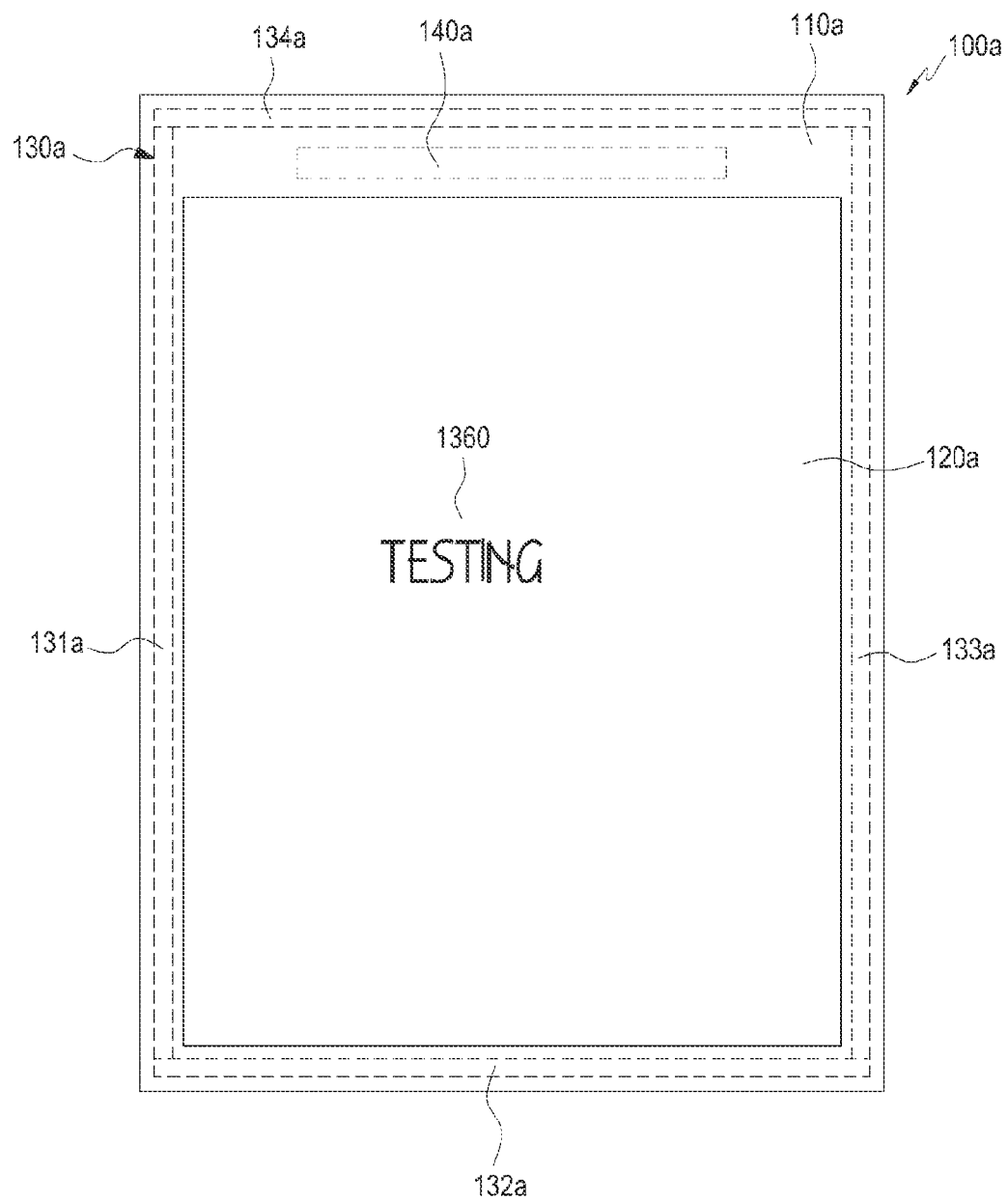

FIGS. 17 and 18 are diagrams illustrating a carbon paper interaction, according to an embodiment of the present invention. As described above, the first EPD panel 100 has a configuration as illustrated in FIGS. 1 to 4, and includes the first cover sheet 110, the first image sheet 120, the first auxiliary sensor 130, and the first main board 140. The term "first" is used for each component of the first EPD panel 100 in order to differentiate the components of the second EPD panel 100a. The second EPD panel 100a has the same configuration as the first EPD panel 100, and includes a second cover sheet 110a, a second image sheet 120a, a second auxiliary sensor 130a with first to fourth strips 131a, 132a, 133a, and 134a, and a second main board 140a.

When the first and second EPD panels 100 and 100a are overlapped, if the binder 1000 is installed on the center of the upper portion of the first and second EPD panels 100 and 100a, the EPD panels 100 and 100a set the carbon paper interaction mode based on the position of the binder 1000. The setting of the interaction modes, with the exception of the discard interaction mode, includes performing the communication connection establishment process described with reference to FIG. 15. The communication connection ends by detaching the binder 1000 from the first and second EPD panels 100 and 100a.

According to an embodiment of the present invention, the first and second EPD panels 100 and 100a do not display content at the initial stage.

As illustrated in FIG. 17, the user uses the user input unit, such as a pen, to input desired content to the image sheet 120 of the first EPD panel 100. According to an embodiment of the present invention, the user inputs writing data with the content of "testing", that is, content 1350, on the first EPD panel 100. As illustrated in FIG. 18, the first EPD panel 100 transmits the content 1350 input by the user to the second EPD panel 100a, and the second EPD panel 100a displays received content 1360 on the second image sheet 120a.

In the present carbon interaction mode, the content written on the master EPD panel is transmitted to all slave EPD panels in the same group. If the binder is detached, each of the EPD panel ends the communication connection and deletes the stored group ID. The storage and deletion of the group ID is performed in order to identify the group to which each of the EPD panel belongs. Through the carbon paper interaction, the user may enable a plurality of EPD panels to display or store the same content with one content input.

Figure 19:
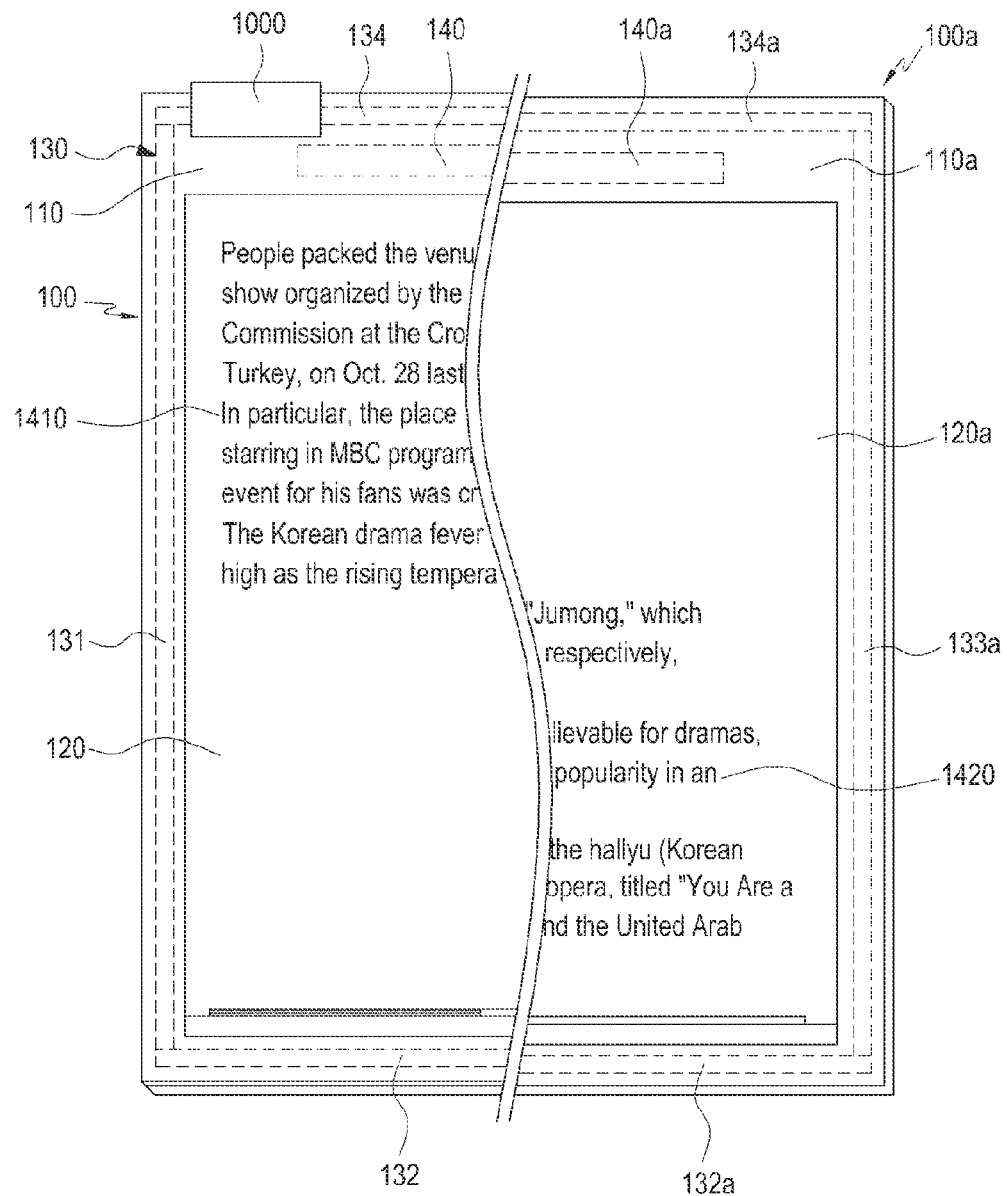
FIGS. 19 and 20 are diagrams illustrating a stapler (or, content integration) interaction, according to an embodiment of the present invention.
Figure 20:
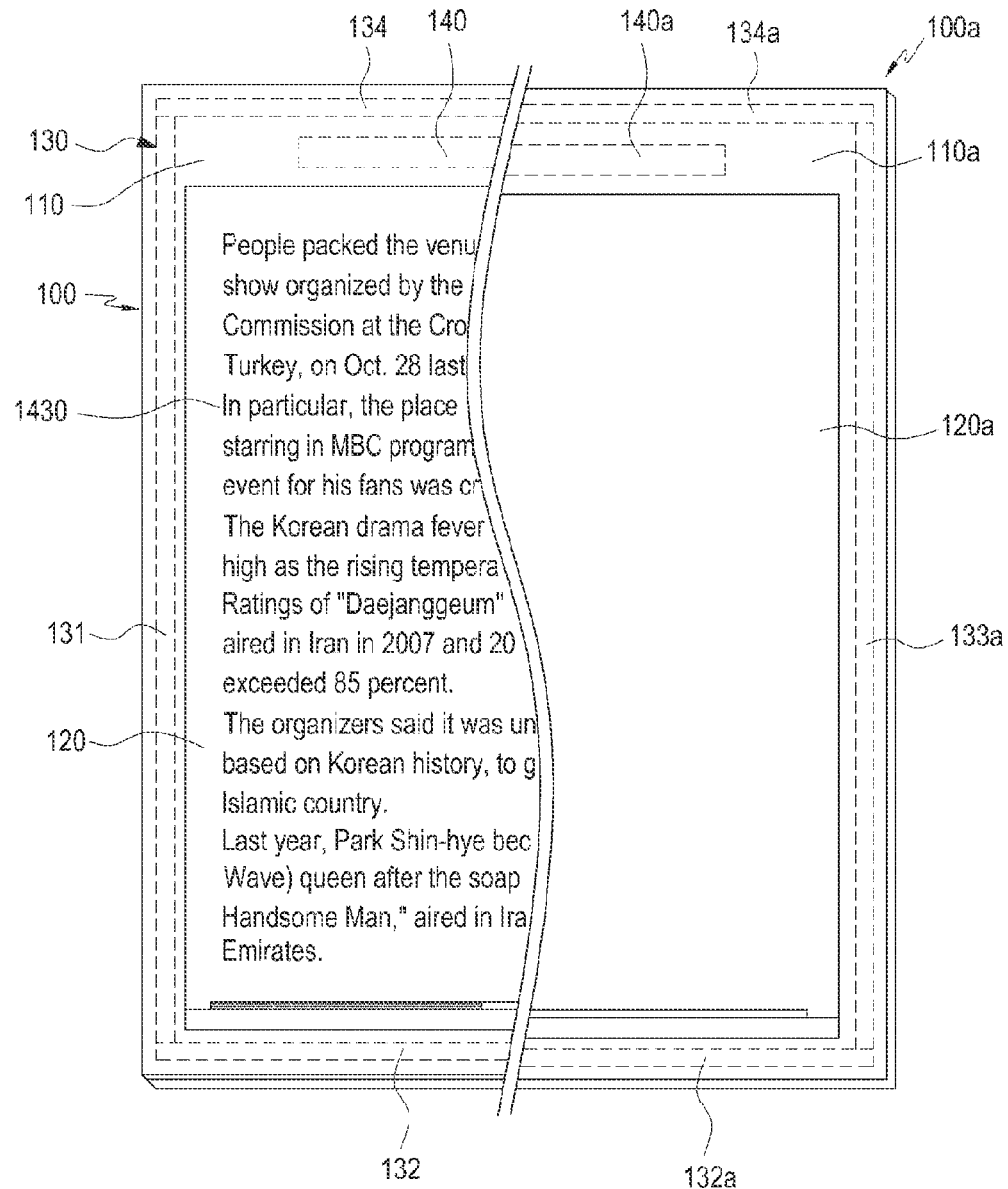

FIGS. 19 and 20 are diagrams illustrating a stapler (or, content integration) interaction, according to an embodiment of the present invention.

When the first and second EPD panels 100 and 100a are overlapped, if the binder 1000 is installed on the left portion of the upper portion of the first and second EPD panels 100 and 100a, the EPD panels 100 and 100a set a stapler interaction mode based on the position of the binder 1000.

According to an embodiment of the present invention, the first half portion (i.e., first content 1410) of entire content of one page is displayed on the first EPD panel 100, and the second half portion (i.e., second content 1420) of the entire content is displayed on the second EPD panel 100a.

As illustrated in FIG. 19, when the first and second EPD panels 100 and 100a are overlapped, if the binder 1000 is installed on the left portion of the upper portion of the first and second EPD panels 100 and 100a, the second EPD panel 100a transmits the second content 1420 to the first EPD panel 100. As illustrated in FIG. 20, the first EPD panel 100 integrates the received second content 1420 and the previously stored first content 1410, and displays the integrated content 1430 on the first image sheet 120. The second EPD panel 100a deletes or does not display the second content 1420 after the transmission of the second content 1420.

In the present stapler (or, content integration) interaction mode, all slave EPD panels in the same group transmit their own content to the master EPD panel in the same group. The master EPD panel integrates and stores all received data into one, and the slave EPD panels may delete their data. According to the stapler interaction, the user may manage pieces of content dispersed in a plurality of EPD panels by integrating and storing the dispersed pieces of content in one EPD panel.

Figure 21:
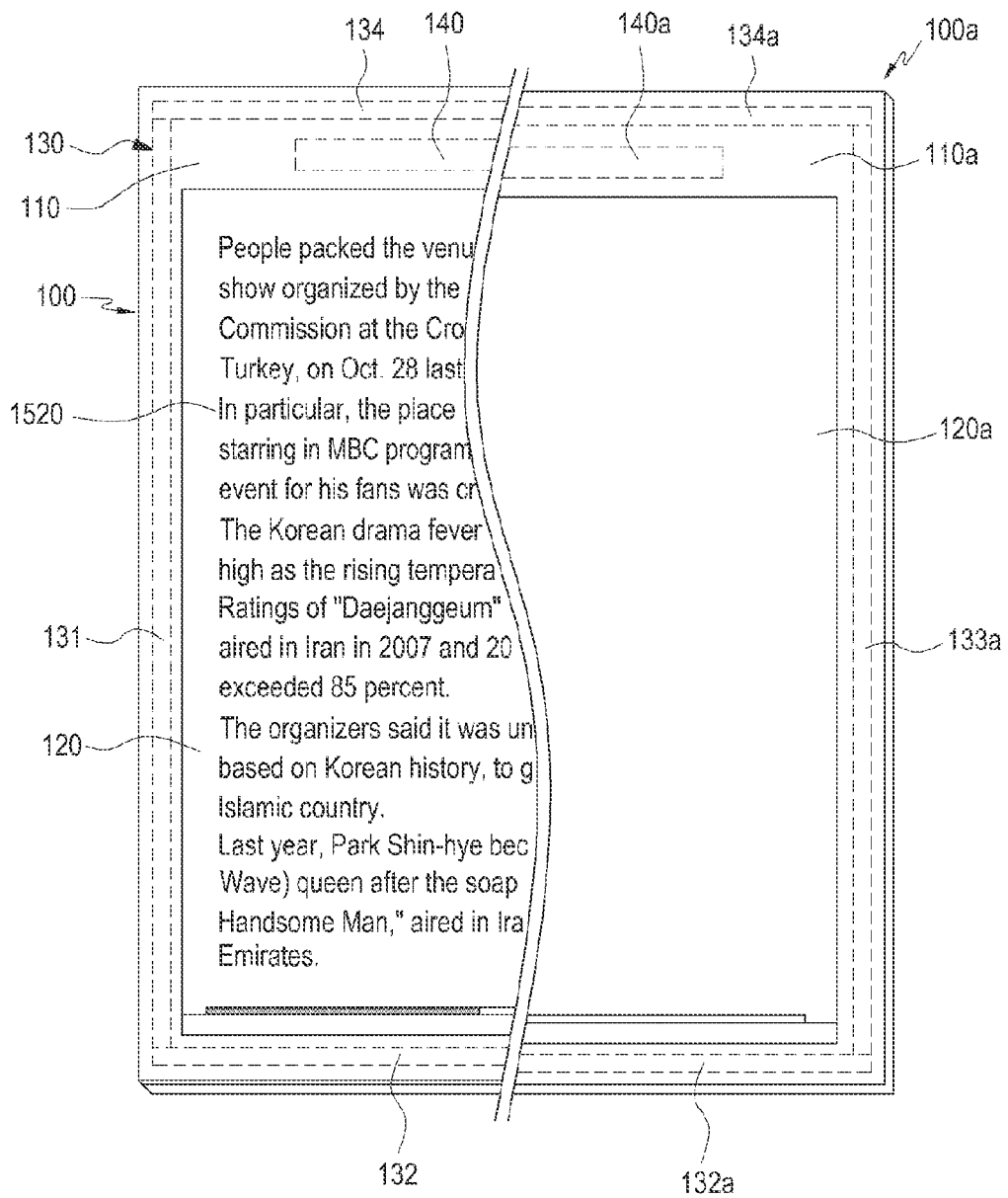
FIGS. 21 and 22 are diagrams illustrating a copy interaction, according to an embodiment of the present invention.
Figure 22:
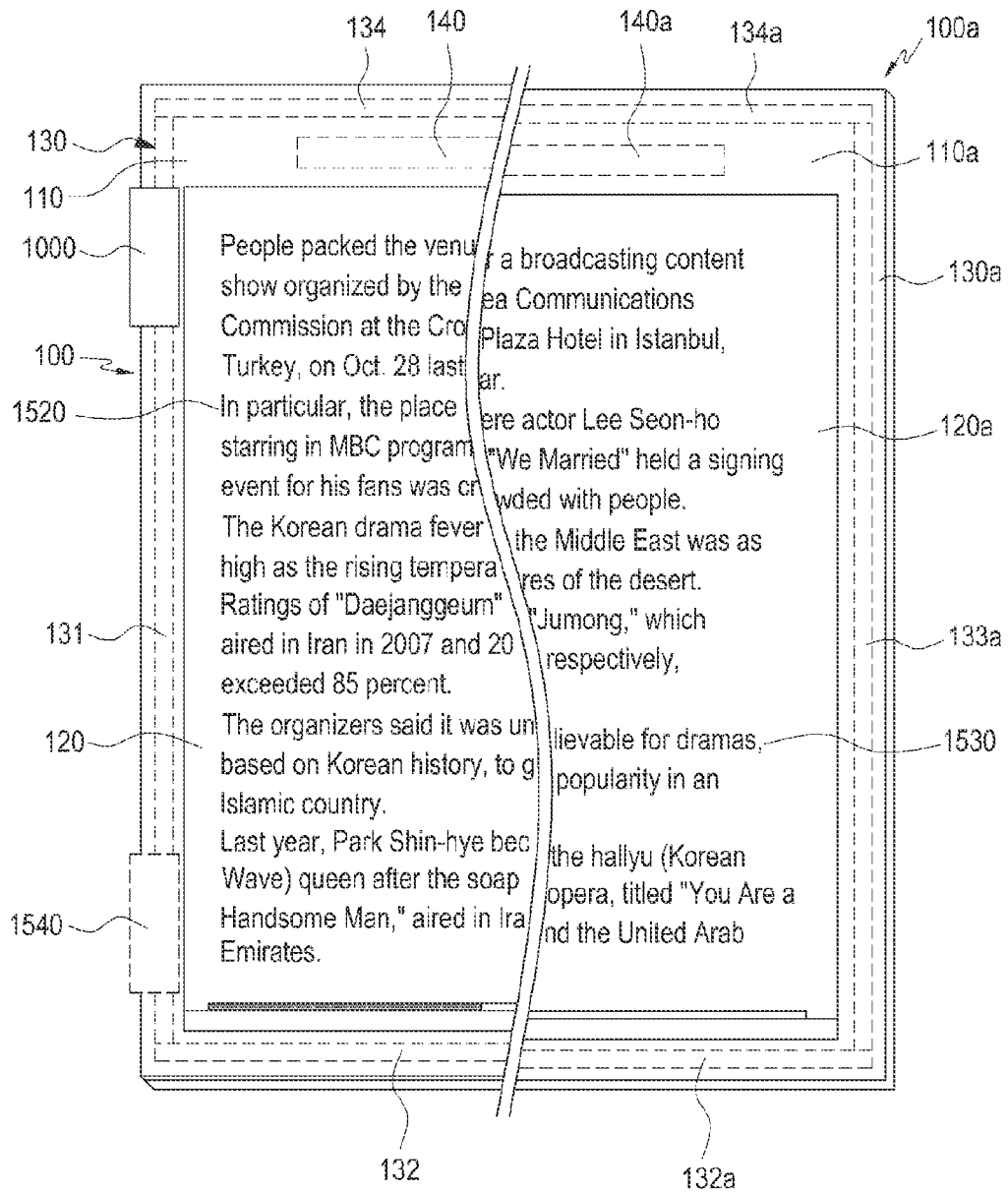

FIGS. 21 and 22 are diagrams illustrating a copy interaction, according to an embodiment of the present invention.

As illustrated in FIG. 21, it is described that content 1520 of one page is displayed on the first EPD panel 100 at the initial stage, and the second EPD panel 100a does not display content.

As illustrated in FIG. 22, when the first and second EPD panels 100 and 100a are overlapped, if the binder 1000 is installed on the upper portion of the left end side of the first and second EPD panels 100 and 100a, each of the EPD panels 100 and 100a sets a copy interaction mode based on the position of the binder 1000. Otherwise, as illustrated in FIG. 22, if the binder 1000 slides from a lower portion 1540 of the left end portion of the first and second EPD panels 100 and 100a in the upper direction, the copy interaction mode may be set.

When the first and second EPD panels 100 and 100a are overlapped, if the binder 1000 is installed on the upper portion of the left end portion of the first and second EPD panels 100 and 100a, the first EPD panel 100 transmits the content 1520 to the second EPD panel 100a, and the second EPD panel 100a stores received content 1530 and displays the stored content 1530 on the second image sheet 120a.

In the copy interaction mode, the master EPD panel in the same group transmits the content of the master EPD panel to all slave EPD panels in the same group, and the slave EPD groups store and display the received content. The user may copy the content stored in one EPD panel to at least one different EPD panel by the copy interaction.

Figure 23:
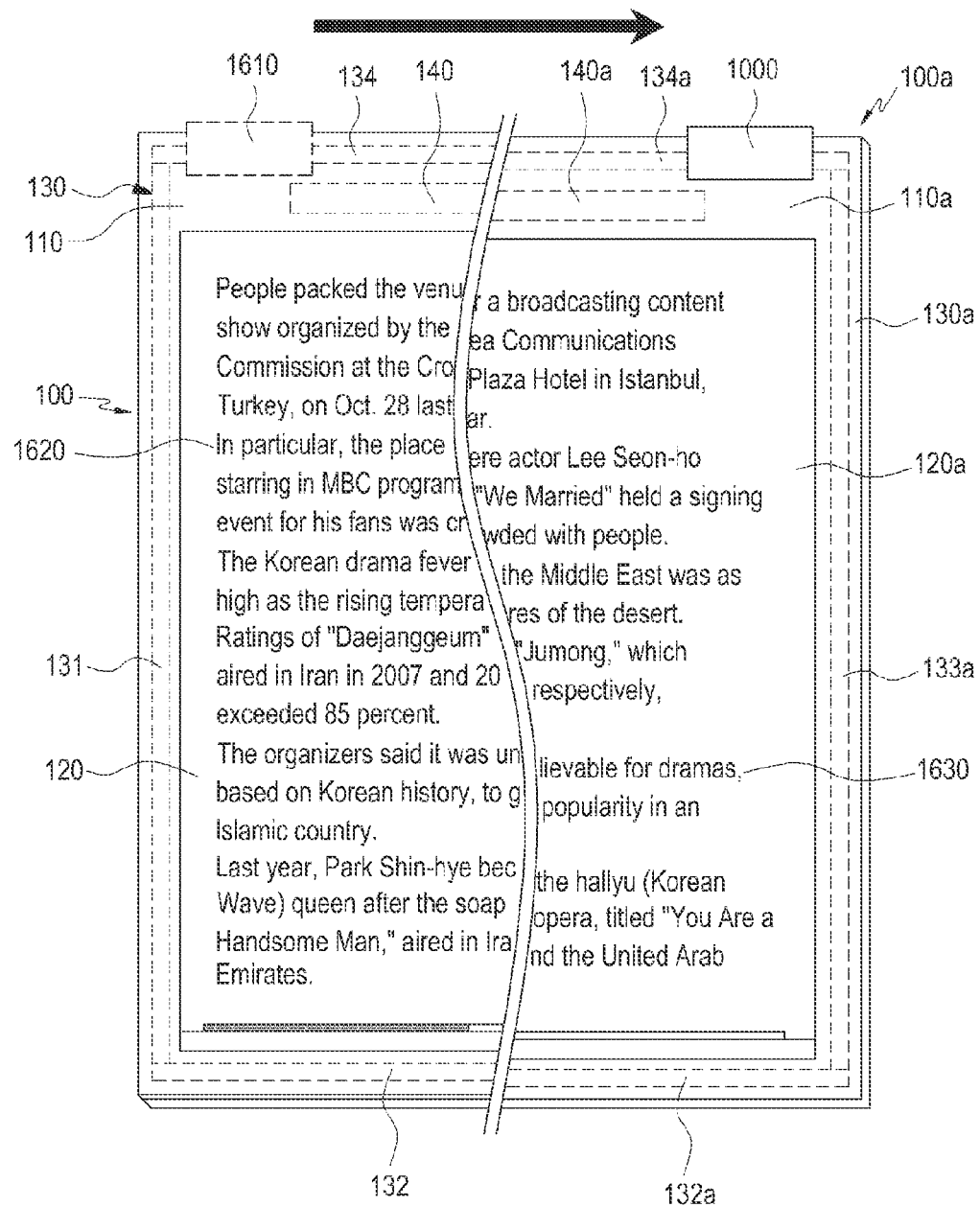
FIGS. 23 and 24 are diagrams illustrating a discard interaction, according to an embodiment of the present invention.
Figure 24:
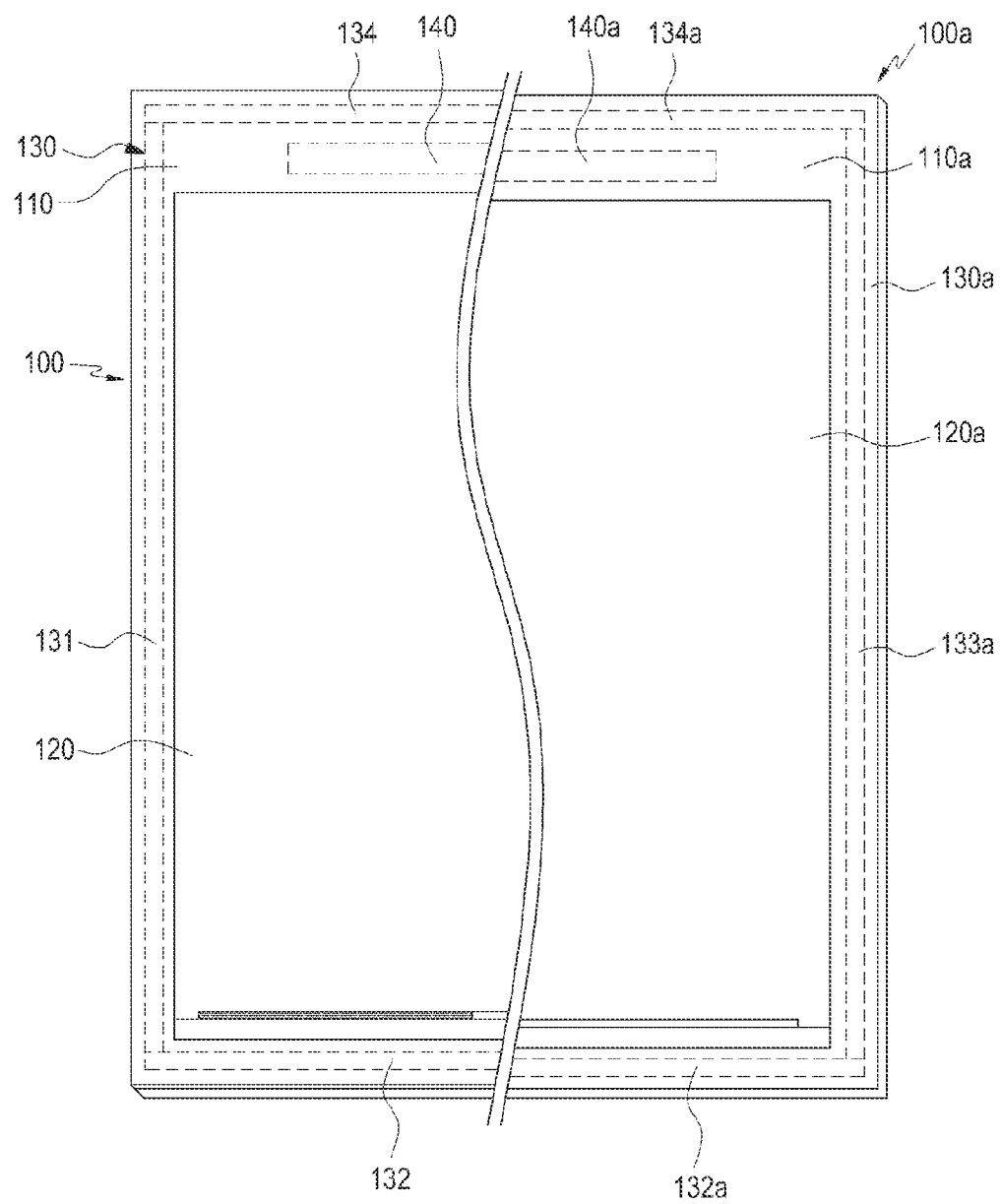

FIGS. 23 and 24 are diagrams illustrating a discard interaction, according to an embodiment of the present invention.

As illustrated in FIG. 23, when the first and second EPD panels 100 and 100a are overlapped, if the binder 1000 is installed on the right portion of the upper portion of the first and second EPD panels 100 and 100a, each of the EPD panels 100 and 100a sets a discard interaction mode based on the position of the binder 1000. If the binder 1000 slides from a left portion 1610 of the upper portion of the first and second EPD panels 100 and 100a in the right direction, the discard interaction mode may be set.

According to an embodiment of the present invention, the EPD panels 100 and 100a display content 1620 and 1630 at the initial stage, respectively.

As illustrated in FIG. 24, when the first and second EPD panels 100 and 100a are overlapped, if the binder 1000 is installed on the right portion of the upper portion of the first and second EPD panels 100 and 100a, the EPD panels 100 and 100a delete or do not display the content 1620 and 1630 from the memories thereof.

In the present discard interaction mode, all the EPD panels in the same group delete their content from their memories or do not display their content on their image sheets. The user may delete pieces of content from a plurality of EPD panels or may not display the pieces of content on image sheets thereof.

In the case of the discard interaction mode, the communication connection establishment process with reference to FIG. 15 may not be performed.

The present invention performs interaction among electronic papers by using the existing paper peripheral devices to easily move/copy/change/delete data. Especially, when copying or deleting a plurality of items of data, the copy or the deletion of the data is simultaneously performed in a short period of time regardless of the number of pages. Further, the processes are wirelessly performed by automatic connection/disconnection of the mobile communication.

It will be appreciated that embodiments of the present invention can be realized in the form of hardware, software, or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits, or on an optically or magnetically readable medium such as, for example, a CD, DVD, magnetic disk or magnetic tape or the like. It will be appreciated that the memory that can be included in an EPD panel is an example of a machine-readable storage medium appropriate for storing a program(s) including instructions for realizing the embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Further, the EPD panel may receive and store the program from the program providing apparatus connected by wire or wirelessly. The program providing apparatus may include a program including instructions that enables the EPD panel to perform interaction methods among predetermined electronic papers, a memory that stores information required for the interaction methods among electronic papers, a communication unit that performs a wired or wireless communication with the EPD panel, and a controller that transmits a corresponding program to the EPD panel automatically or by a request of the EPD panel.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for performing interaction between electronic papers, the method comprising the steps of:
   determining, by a first electronic paper, a current installation position of a binder on the first electronic paper;
   determining, by the first electronic paper, an interaction mode of the first electronic paper corresponding to the current installation position of the binder from among a plurality of interaction modes corresponding to a plurality of installation positions of the binder; and
   performing, by the first electronic paper, direct data communication with a second electronic paper on which the binder is also installed, according to the determined interaction mode,
   wherein performing the direct data communication comprises:
      transmitting, directly to the second electronic paper by the first electronic paper, content currently displayed on the first electronic paper; or
      receiving, directly from the second electronic paper by the first electronic paper, content currently displayed on the second electronic paper.

2. The interaction method according to claim 1, wherein performing the direct data communication comprises:
   receiving, by the first electronic paper, content input by a user;
   displaying, by the first electronic paper, the content; and
   transmitting, by the first electronic paper, the content directly to the second electronic paper.

3. The interaction method according to claim 1, wherein performing the direct data communication comprises:
   displaying, by the first electronic paper, first content;
   receiving, the second electronic paper by the first electronic paper, second content currently displayed on the second electronic paper; and
   displaying, by the first electronic paper, the second content along with the first content.

4. The interaction method according to claim 1, wherein the first electronic paper automatically establishes a direct communication connection with the second electronic paper according to a predetermined communication scheme.

5. The interaction method according to claim 4, wherein the first electronic paper automatically disconnects the direct communication connection with the second electronic paper when the binder is detached from the first electronic paper.

6. A non-transitory machine-readable storage medium for storing one or more programs that when executed implement the steps of:
   determining, by a first electronic paper, a current installation position of a binder on the first electronic paper;
   determining, by the first electronic paper, an interaction mode of the first electronic paper corresponding to the current installation position of the binder from among a plurality of interaction modes corresponding to a plurality of installation positions of the binder; and
   performing, by the first electronic paper, direct data communication with a second electronic paper on which the binder is also installed, according to the determined interaction mode,
   wherein performing the direct data communication comprises:

transmitting, directly to the second electronic paper by the first electronic paper, content currently displayed on first electronic paper; or receiving, directly from the second electronic paper by the first electronic paper, content currently displayed on the second electronic paper.

7. The non-transitory machine-readable storage medium according to claim 6, wherein performing the direct data communication comprises:

receiving, by the first electronic paper, content input by a user;

displaying, by the first electronic paper, the content; and transmitting, by the first electronic paper, the content directly to the second electronic paper.

8. The non-transitory machine-readable storage medium according to claim 6, wherein performing the direct data communication comprises:

displaying, by the first electronic paper, first content;

receiving, directly from the second electronic paper by the first electronic paper, second content currently displayed on the second electronic paper; and displaying, by the first electronic paper, the second content along with the first content.

9. The non-transitory machine-readable storage medium according to claim 6, wherein the first electronic paper automatically establishes a direct communication connection with the second electronic paper according to a predetermined communication scheme.

10. The non-transitory machine-readable storage medium according to claim 9, wherein the first electronic paper automatically disconnects the direct communication connection with the second electronic paper when the binder is detached from the first electronic paper.

11. An article of manufacture for performing interaction between electronic papers comprising a non-transitory machine-readable storage medium for storing one or more programs that when executed implement the steps of:

determining, by a first electronic paper, a current installation position of a binder on the first electronic paper;

determining, by the first electronic paper, an interaction mode of the first electronic paper corresponding to the current installation position of the binder from among a plurality of interaction modes corresponding to a plurality of installation positions of the binder; and performing, by the first electronic paper, direct data communication with a second electronic paper on which the binder is also installed, according to the determined interaction mode, wherein performing the direct data communication comprises:

transmitting, directly to the second electronic paper by the first electronic paper, content currently displayed on first electronic paper; or receiving, directly from the second electronic paper by the first electronic paper, content currently displayed on the second electronic paper.

12. The article of manufacture according to claim 11, wherein performing the direct data communication comprises:

receiving, by the first electronic paper, content input by a user;

displaying, by the first electronic paper, the content; and transmitting, by the first electronic paper, the content directly to the second electronic paper.

13. The article of manufacture according to claim 11, wherein performing the direct data communication comprises:

displaying, by the first electronic paper, first content;

receiving, directly from the second electronic paper by the first electronic paper, second content currently displayed on the second electronic paper; and displaying, by the first electronic paper, the second content along with the first content.

14. The article of manufacture to claim 11, wherein the first electronic paper automatically establishes a direct communication connection with the second electronic paper according to a predetermined communication scheme.

15. The article of manufacture according to claim 14, wherein the first electronic paper automatically disconnects the direct communication connection with the second electronic paper when the binder is detached from the first electronic paper.

16. A first electronic paper comprising:

a sensor configured to detect a current installation position of a binder on the electronic paper;

a communication unit; and a controller configured to:

determine an interaction mode of first electronic paper corresponding to the current installation position of the binder from among a plurality of interaction modes corresponding to a plurality of installation positions of the binder;

perform, through the communication unit, direct data communication with a second electronic paper on which the binder is also installed, according to the determined interaction mode, wherein performing of the direct data communication comprises:

transmitting, directly to the second electronic paper, content currently displayed on first electronic paper through the communication unit; or receiving, directly from the second electronic paper, content currently displayed on the second electronic paper through the communication unit.

17. The first electronic paper according to claim 16, wherein the controller is configured to:

receive content input by a user through the electronic paper;

display the content on the first electronic paper; and transmit the content directly to the second electronic paper.

18. The first electronic paper according to claim 16, wherein the controller is configured to:

display first content on the first electronic paper;

receive, directly from the second electronic paper, second content currently displayed on the second electronic paper; and display, on the first electronic paper, the second content along with the first content.

19. The first electronic paper according to claim 16, wherein the controller is configured to automatically establish a direct communication connection with the second electronic paper according to a predetermined communication scheme.

20. The first electronic paper according to claim 19, wherein the controller is configured to disconnect the direct communication connection with the second electronic paper when the binder is detached from the electronic paper.

* * * * *